(12) United States Patent
Brown et al.

(10) Patent No.: US 7,185,000 B1
(45) Date of Patent: Feb. 27, 2007

(54) METHOD AND APPARATUS FOR PRESENTING QUERY PLANS

(75) Inventors: Douglas P. Brown, Rancho Santa Fe, CA (US); Paul L. Sinclair, Manhattan Beach, CA (US)

(73) Assignee: NCR Corp., Dayton, OH (US)

( * ) Notice: Subject to any disclaimer, the term of this patent is extended or adjusted under 35 U.S.C. 154(b) by 1281 days.

(21) Appl. No.: 09/608,976

(22) Filed: Jun. 30, 2000

(51) Int. Cl.
*G06F 7/00* (2006.01)
*G06F 17/30* (2006.01)

(52) U.S. Cl. .......................................... 707/3; 707/102
(58) Field of Classification Search ................. 707/3; 395/603
See application file for complete search history.

(56) References Cited

U.S. PATENT DOCUMENTS

| | | | |
|---|---|---|---|
| 5,303,383 A | 4/1994 | Neches et al. | |
| 5,640,584 A | 6/1997 | Kandasamy et al. | |
| 5,857,180 A * | 1/1999 | Hallmark et al. | 707/2 |
| 5,864,842 A | 1/1999 | Pederson et al. | |
| 5,884,299 A | 3/1999 | Ramesh et al. | |
| 5,943,666 A * | 8/1999 | Kleewein et al. | 707/2 |
| 6,067,542 A * | 5/2000 | Carino, Jr. | 707/4 |
| 6,289,334 B1 * | 9/2001 | Reiner et al. | 707/3 |
| 6,414,307 B1 * | 7/2002 | Jones et al. | 707/525 |
| 6,415,307 B2 * | 7/2002 | Jones et al. | 715/525 |
| 6,434,545 B1 * | 8/2002 | MacLeod et al. | 707/3 |
| 6,507,834 B1 * | 1/2003 | Kabra et al. | 707/2 |

* cited by examiner

*Primary Examiner*—Apu Mofiz
*Assistant Examiner*—Susan Yu Chen
(74) *Attorney, Agent, or Firm*—Trop, Pruner & Hu

(57) ABSTRACT

An execution plan of a query for a parallel database system is determined. In one arrangement, the parallel database system is a relational database management system. The execution plan of the query is determined by an optimizer program. Execution plans are inserted into one or more explain tables that are accessible by a visual explain and compare module to display the steps of the execution plan in a graphical user interface. Parallel execution of steps of the execution plan can be depicted in the graphical user interface. Further, plural execution plans for a given query under different conditions may be displayed for comparison.

27 Claims, 22 Drawing Sheets

METHOD AND APPARATUS FOR PRESENTING QUERY PLANS

TECHNICAL FIELD

The invention relates to methods and apparatus for presenting query plans.

BACKGROUND

In relational database management systems (RDBMS), users querying the database need not specify how to access the data, but only what data is desired. One of the goals of a database management system is to optimize the performance of queries for access and manipulation of data stored in the database. This is accomplished by use of an optimizer program. Given a query, the optimizer program generates several alternative plans for accessing the requested data. The execution cost of each alternative is estimated and the optimum execution plan is selected to access the data in an efficient manner.

Conventionally, database management systems provide a mechanism for a user to view the execution plan for a given query. In some systems, to view the steps of the execution plan for a given query, such as one selected by an optimizer program, an SQL (Structured Query Language) Explain statement is issued. In some systems, the query execution plan may be presented in text format.

The complexity of a query execution plan is related to the size and complexity of the database management system. For example, in many data warehousing systems, the platforms used to run the database management software are multi-node parallel processing systems having tens or even hundreds of nodes (sometimes referred to as massively parallel processing or MPP systems). The amount of data stored frequently exceeds tens or hundreds of gigabytes and in many cases is in the terabyte range. As the complexity of the system increases, the complexity of the execution plans for a given query also increases.

Presenting a query execution plan in text format is often sufficient for relatively simple and straight-forward execution plans. However, as the complexity of the execution plans grows, a more sophisticated mechanism is needed to depict query execution plans.

Another need of software development is regression testing, which is testing that is performed whenever software is modified to provide some confidence that the modified code behaves as intended and that modifications have not inadvertently disrupted the behavior of unmodified code. Modifications to database management software, including optimizer programs, can cause crashes or sub-optimal execution of query plans if regressions are not properly detected.

SUMMARY

In general, according to one embodiment, a method of presenting an execution plan for a query comprises determining steps of the query execution plan in a parallel database system and displaying the steps of the query execution plan in a graphical user interface. Parallel execution of steps of the query execution plan is depicted in the graphical user interface.

In general, in accordance with another embodiment, a method of testing performance of a query comprises determining a first execution plan of the query under a first condition and determining a second execution plan of the query under a second condition. The first and second execution plans are displayed concurrently to enable comparison of the execution plans.

Other features and embodiments will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In accordance with some embodiments, a visual explain and compare feature allows a user to view steps of an execution plan for a given query in a graphical user interface of a system. In some embodiments, queries are according to the Structured Query Language (SQL) standard. However, queries according to other standards may be employed in further embodiments.

The visual explain and compare feature also allows a user to compare execution plans of a given query under different conditions (e.g., such as execution plans generated by different versions of an optimizer program). The visual explain and compare feature is provided by a visual explain and compare component executable in the system, which may be a test system or a target (or customer) system. When executed on a target system, the visual explain and compare component allows a user at the target system to visually view execution plans as well as compare execution plans of a query under different conditions.

When executed on a test system that is remote from a target (or customer) system, the visual explain and compare component works with execution plans generated in an emulated environment of the target system. Target-level emulation in the test system to emulate the target system is performed by capturing environment information from the target system. An extractor module in the target system extracts the desired target environment information and communicates the environment information to the test system. The captured target environment information is stored in and/or mapped to appropriate tables, files, and other storage locations in the test system. Execution plans are generated based on the emulated environment, with the visual explain and compare component used to visually depict the generated execution plans.

Figure 1:
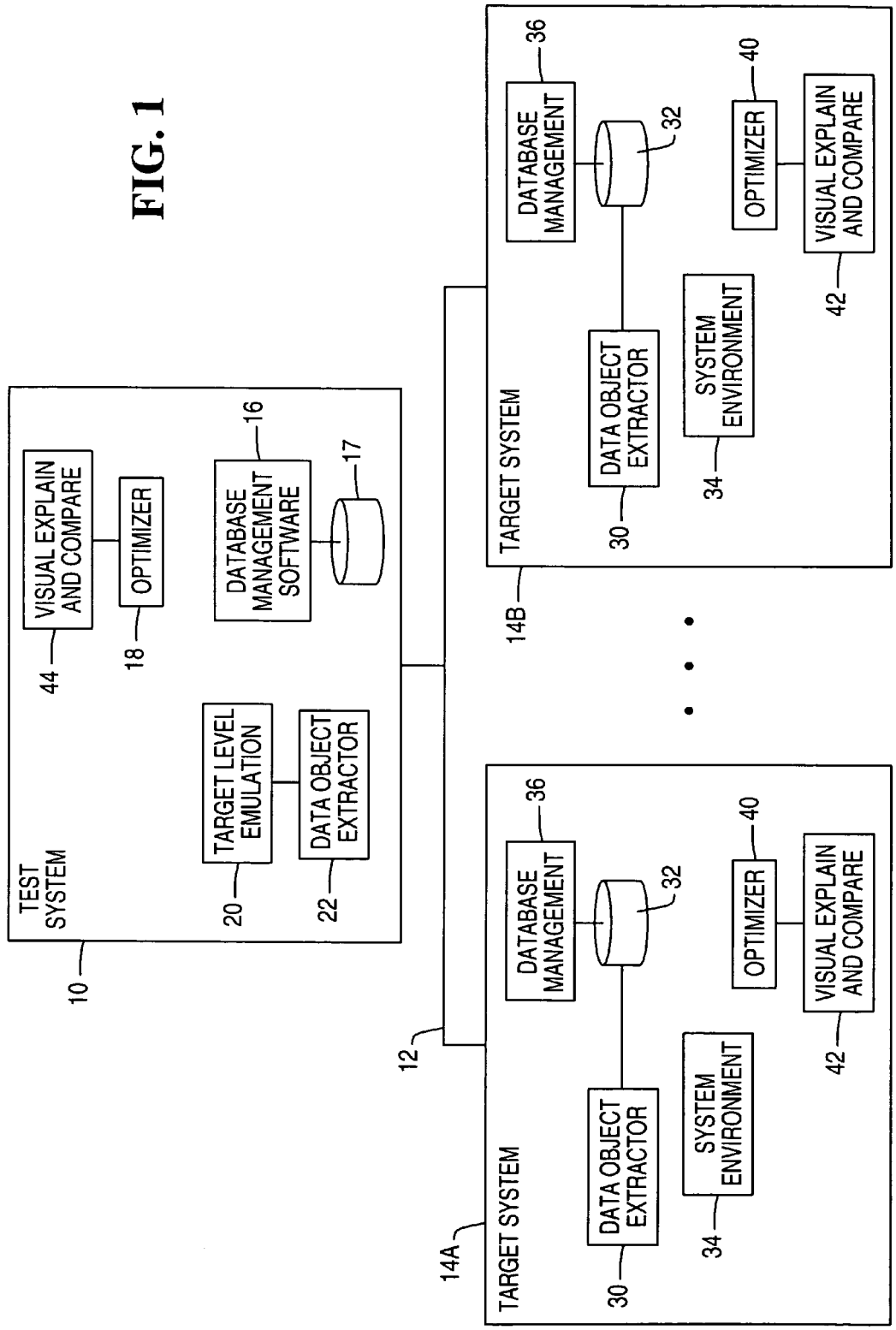
FIG. 1 is a block diagram of plural target systems and a test system, in accordance with an embodiment.

Referring to FIG. 1, several target systems (14A, 14B) are illustrated. Each target system 14 represents a user or customer system on which software, such as relational database system software, is executed. Thus, for example, the target system 14A is located at a first customer site, while the target system 14B is located at a second customer site. In one example, the software running in each target system 14 includes database management software 36, e.g., a data warehouse application, such as the Teradata® product from NCR Corporation. In each target system 14, the database management software 36 manages access requests to a database 32. In accordance with some embodiments, the database 32 includes a parallel database distributed across plural nodes in each target system 14. Each target system 14 can be a multi-node parallel processing system (sometimes referred to as a massively multiprocessing or MPP system). Alternatively, the target system 14 is a single-node system having plural central processing units or CPUs (sometimes referred to as a symmetric multiprocessing or SMP system).

Each of the target systems 14 includes an optimizer module 40 to optimize execution plans for a given query. The optimizer module 40 generates alternative execution plans for the given query and selects the optimal query plan, which may be the most cost-effective execution plan or one of the more cost-effective execution plans. The optimizer module 40 identifies an execution plan (query plan, join plan, or strategy) that reduces the estimated response time of a given query. The response time is the amount of time it takes to complete the execution of the query on the given target parallel system. One technique of query optimization use is a cost model to estimate the response time of a given query plan and to search the space of query plans to return a plan with a low cost. In the cost-based optimization model, different methods for doing a unit of work is compared and the most efficient method is selected (the plan with the lowest cost). Because the number of alternatives may be quite large, especially in a parallel system with a large number of nodes running a large relational database, the query optimizer module 40 uses statistics and/or sampling techniques to reduce the search space in optimizing queries.

The query execution plans selected by the optimizer 40 can be stored in the target system 14, with the execution plan accessible by a visual explain and compare module 42 to graphically depict or display the execution plan. The visual explain and compare component 42 provides a graphical user interface in which steps of the execution plan can be displayed. Each step of the execution plan can be depicted as an icon, with the icons connected by lines to represent the flow of the steps in the execution plan.

Another feature of the visual explain and compare module 42 is the ability to compare plural execution plans for a given query, with the plural execution plans generated under different conditions. This provides the user with the ability to analyze differences between different execution plans, which may result if software, such as the optimizer module 40, has been modified to a newer version. With the compare feature, the execution plans generated by different versions of the optimizer module 40 may be compared to ensure that inadvertent problems have not been introduced due to the modification, which may cause system crashes or sub-optimal execution of queries. Execution plans of a given query can also change in response to differences in other conditions, such as differences in the database management system, differences in the platform on which the database management system is executed, differences in other software (e.g., applications, operating systems), different contents of tables, and so forth.

Each target system 14 comprises a system environment 34, which is made up of system-specific information as well as database-level information of each target system. As used here, "environment information" of a target system refers to the system-specific information, database-level information, or any portion of the system-specific or database-level information. System-specific information includes such information as the number of nodes in the target system, the number of CPUs per node, the number of virtual processors in each node, and other system information. Database-level information includes statistics, data manipulation language (DML) statements, data definition language (DDL) statements, and the actual data of the database itself. Statistics include information on how data is structured in the database, the number of rows in a table, the data demographics of a table, and highest and lowest values of a column. Statistics may be sampled randomly from each node of a target system. DDL statements affect the structure of database objects, and may include statements such as SQL (Structured Query Language) ALTER statements (to redefine or alter databases, tables, indexes, etc.), CREATE statements (to create databases, indexes, tables, etc.), and so forth. DML statements are statements that manipulate data, such as the COMMIT statement (to make permanent all changes since the beginning of a transaction), DELETE statement (to remove rows from a table), INSERT statement (to add new rows to a table), SELECT statement (to perform a query by selecting rows and columns from one or more tables), UPDATE statement (to change data in a table), and so forth.

For remote testing of various features of target systems, the environment information of a target system is captured and communicated to a test system 10 coupled over a data network 12. The data network 12 can be a private network, or it may be a public network, such as the Internet. For privacy in a public network, data exchanged between the test system 10 and one of the target systems 14A, 14B may be protected by a security protocol. Communications over the data network 12 can be according to various techniques, including electronic mail, file transfer, web browsing, and so forth.

To capture the environment of a target system 14 for the purpose of emulation, environment information is extracted in the target system and communicated over the network 12 to the test system 10. Each target system 14 includes a data object extractor 30 to extract desired environment information. The data object extractor 30 captures system-specific information (also referred to as cost-related information) and database-level information from the corresponding target system 14 and communicates the captured environment information to the test system 10. The data object extractor 30 in each target system 14 cooperates with a data object extractor 22 in the test system 10. The communication of the extracted data may be performed in a number of different ways, e.g., sent by electronic mail, sent by file transfer, downloaded from a web site, and so forth.

In some embodiments, the data object extraction process occurs in two phases. First, the data object extractor 30 in the target system 14 dumps target environment information (including cost-related information, statistics, DDL statements, DML statements, actual database data) from each target system 14 to the test system 10. After the target environment information is copied from the data object extractor 30 to the test system 10, a second process, referred to as an "apply process," is performed in which the data received from the target system 14 is loaded and/or mapped into appropriate tables or system files in the test system 10. The target environment information that has been loaded into the test system 10 is referred to as target-level emulation data 20. The loading and applying process is performed by the data object extractor 22 running inside the test system 10 (in cooperation with the data object extractor 30 in each target system 14).

The test system 10 further includes an optimizer module 18 for optimizing queries to a database 17 managed by database management software 16 running in the test system 10. For more accurate performance determinations, the optimizer module 18 uses target-level emulation data 20 that has been communicated from a target system 14 to the test system 10. Based on the target-level emulation data 20, the optimizer module 18 selects the most efficient query (or lowest cost) execution plan for a given query in the test system 10. Hooks in the optimizer module 18 enables the optimizer module 18 to access information stored in databases and tables containing the target-level emulation data 20.

The test system 10 also runs a visual explain and compare module 44 that is similar to the visual explain and compare module 42 in each target system 14. The visual explain and compare module 44 in the test system 10 is able to graphically display the execution plans selected by the optimizer module 18 based on the target-level emulation data 20.

Although the presence of the test system 10 enables remote testing of query plan generation based on an emulated target environment in some embodiments, the test system 10 is not necessary in other embodiments. The visual explain and compare module (42, 44) can be executed in any system in which visualization and/or comparison of query execution plans is desired. In addition, although reference is made to visual explain and compare modules in this description, the present invention is not limited to embodiments in which both the visual explain and the visual compare features are implemented, as the compare feature may be omitted in some embodiments.

Figure 2:
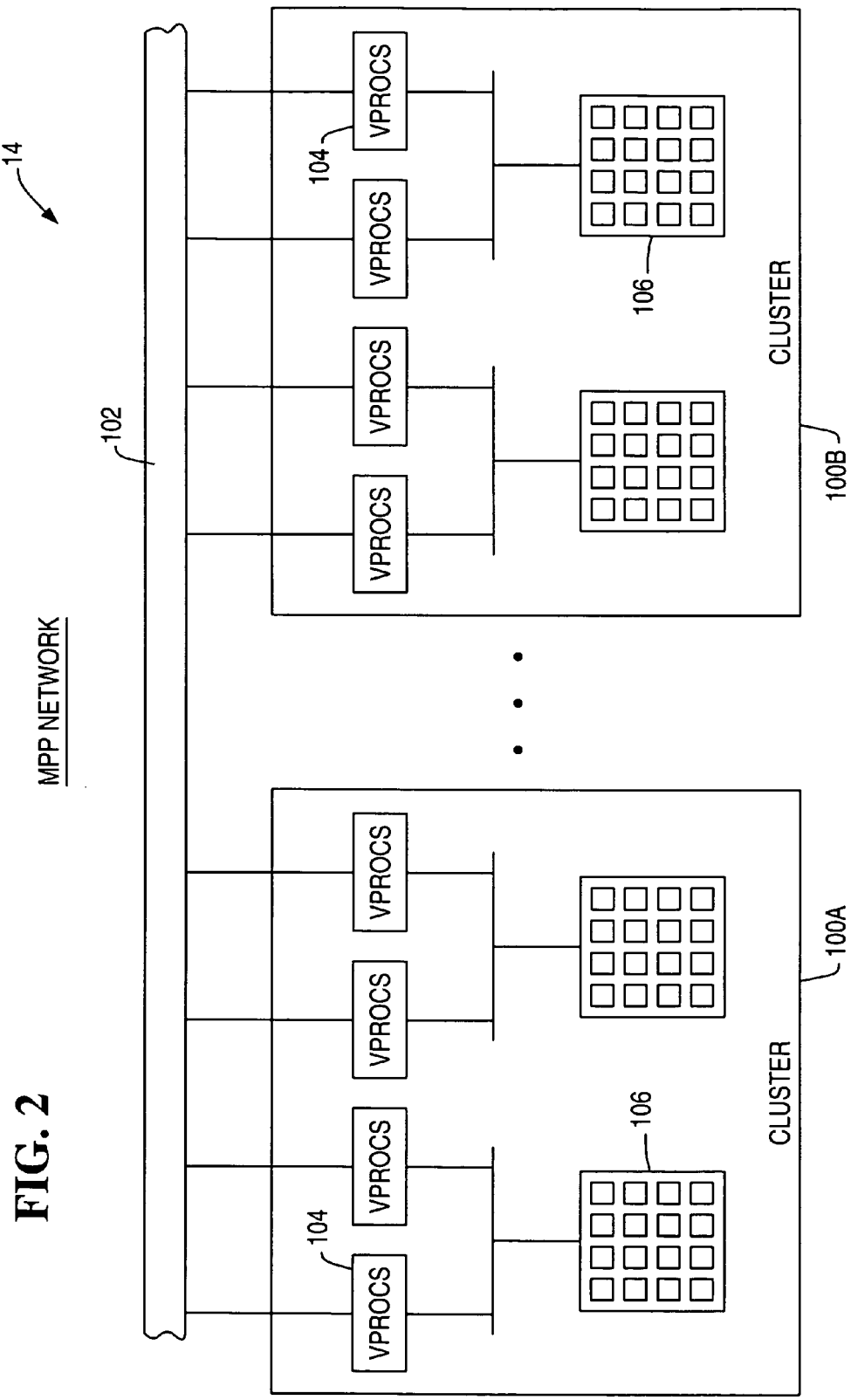
FIG. 2 is a block diagram of an example target system.

Referring to FIG. 2, an example arrangement of a target multi-node parallel system 14 is illustrated. The target system 14 has plural nodes 100A, 100B, and so forth, coupled by an interconnect network 102. Each node may include a single central processing unit (CPU) or multiple CPUs. Nodes that are responsible for managing portions of a parallel relational database are referred to as access module processors (AMPs). These are distinguished from other types of nodes that may provide user interface tasks, which are referred to as interface processors (IFPs), which are not illustrated in FIG. 2.

In addition, as illustrated in FIG. 2, each node 100 (or AMP) includes multiple virtual processors (VPROCs) 104 to more efficiently handle access requests to storage devices 106. Each VPROC 104 may be responsible for a logical disk space, referred to as a virtual disk, which may include one or more storage devices 106. The combination of the storage devices 106 may be referred to as a cluster. The concept of VPROCs and virtual disks enable a larger amount of parallelism in the parallel system 14. Examples of VPROCs include parsing engines (PEs) and virtual access module processors (VAMPs). More than one PE or VAMP can run in each node.

In further embodiments, plural VPROCs, such as PEs and VAMPs, are also executable in a single-node multiprocessing system such as an SMP system. In the single-node system, plural VPROCs can be distributed across plural central processing units (CPUs) of the system. Thus, more generally, multiple virtual processors responsible for handling access requests to a parallel database are executable in a system. As used here, a "parallel system" refers to a multi-node parallel processing system, a single-node multi-processing system with multiple CPUs, or a single-node system with a single CPU running multiple virtual processors.

Figure 3:
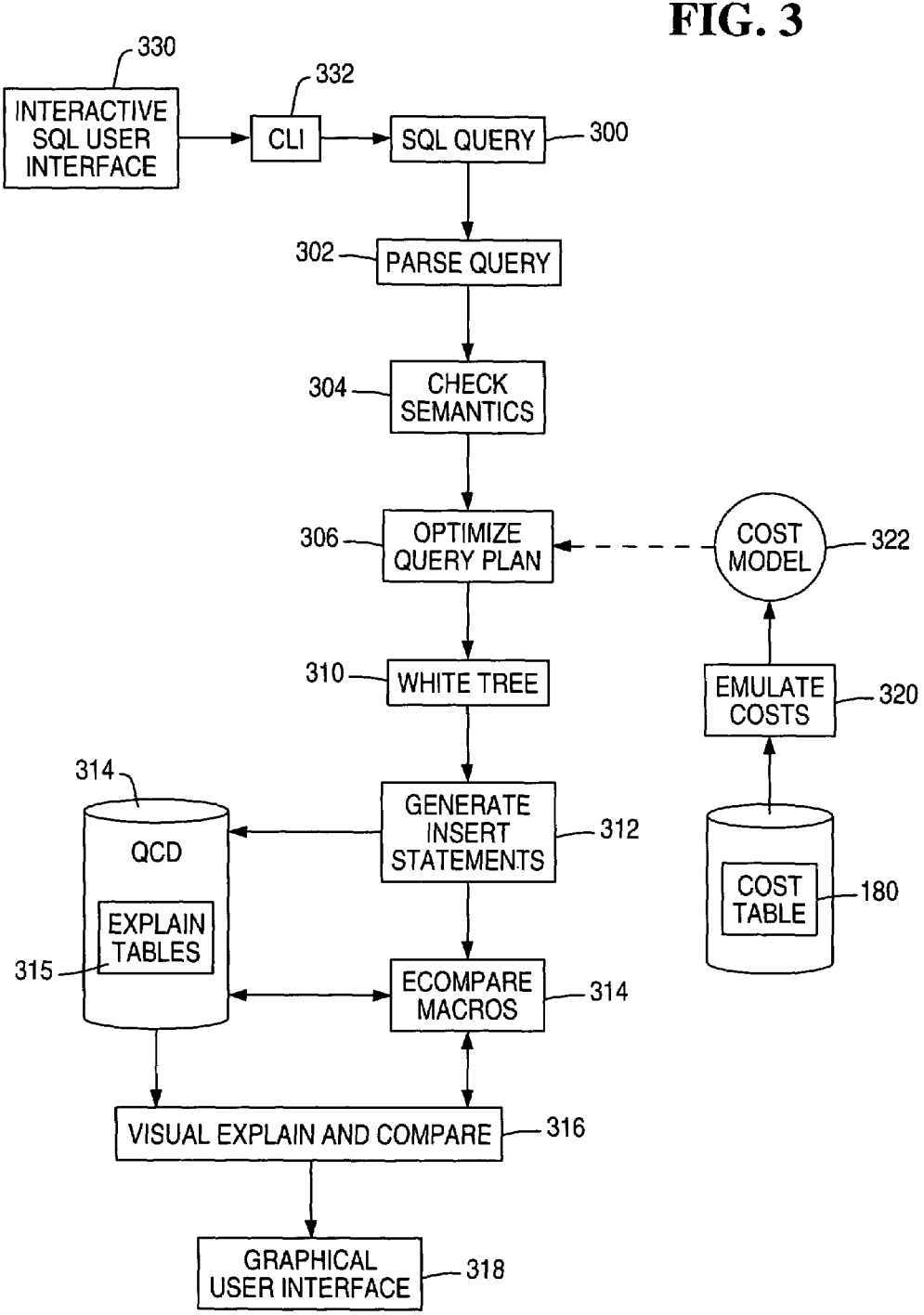
FIG. 3 illustrates generally a process of providing a visual explain and compare capability in accordance with an embodiment.
Figure 4:
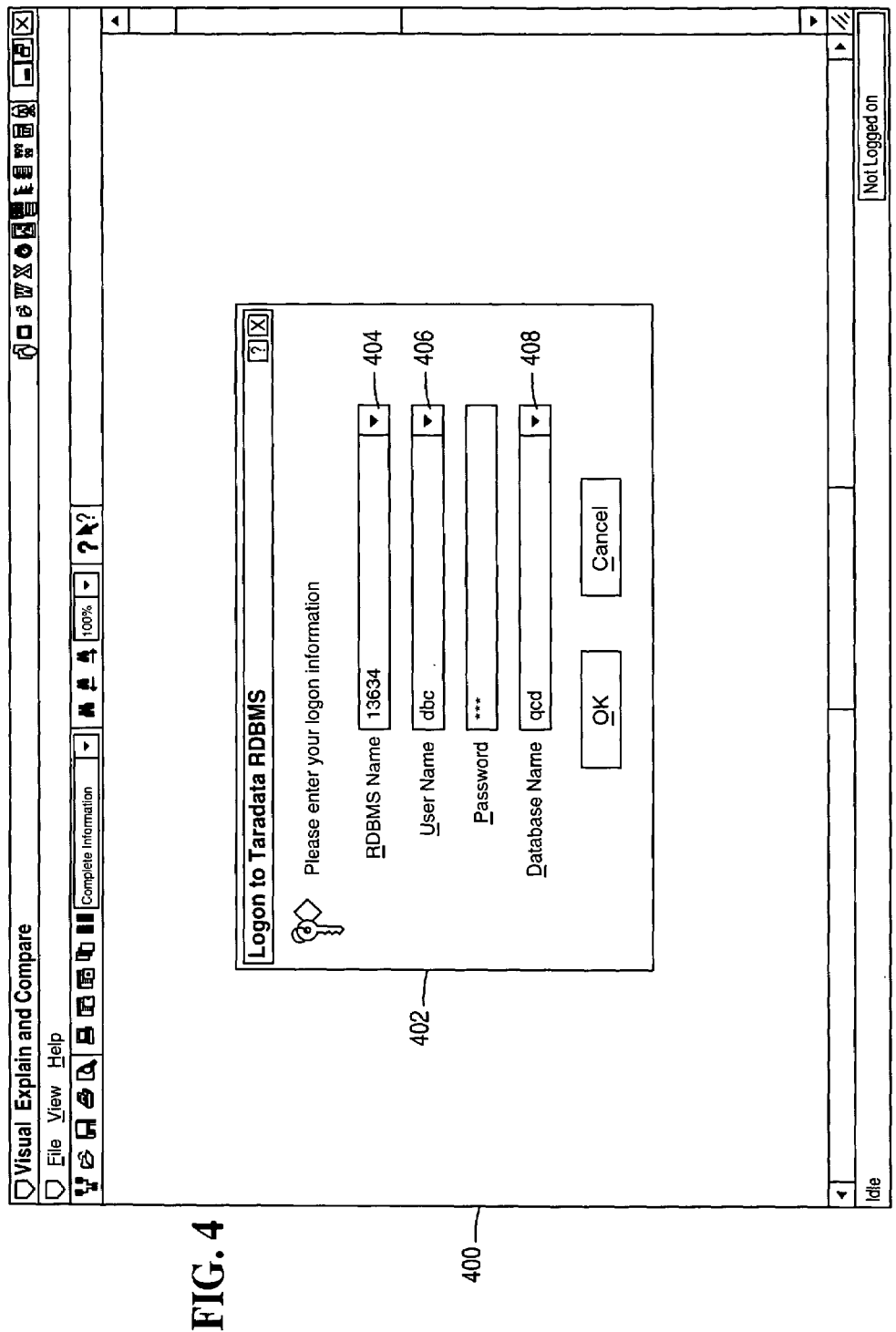
FIGS. 4–16 illustrate various screens to enable the visual explain of one or more query execution plans in accordance with an embodiment.

Referring to FIG. 3, generation, processing, optimizing, and viewing of the execution plan associated with a query are illustrated. Through an interactive SQL user interface 330, a user may specify SQL statements to submit to the optimizer module (40, 18) for optimization. The interactive SQL user interface 330 issues an SQL query through an SQL call level interface (CLI) 332, which in one embodiment is the SQL/CLI programming call level interface to SQL databases. An SQL query 300 issued through the interactive SQL user interface 330 and the CLI 332 is parsed (at 302) by a parser. Semantics of the query are checked (at 304). The parsed query is then forwarded to the optimizer module (40, 18), where the query is optimized (at 306) to identify the most efficient (or lowest cost) execution plan. The execution plan generated by the optimizer module (40, 18) in one embodiment is in a tree structure, referred to as a white tree 310.

In response to generation (at 312) of INSERT statements, execution plans in the white tree 310 are inserted into one or more explain tables 315 (relational tables) in a query capture database 314. Through ECompare macros 314, a visual explain and compare module 316 (corresponding to either the module 42 or 44) can access execution plans stored in the explain tables 315 for display in a graphical user interface 318.

If the process depicted in FIG. 3 is performed in a target system 14, then the optimization by the optimizer module 40 is performed in an actual target system environment. However, if the process of FIG. 3 is performed in the test system 10, then a cost table 180 stored in the test system is accessed to emulate costs (at 320) to provide a cost model 322 that is accessed by the optimizer module 18 to optimize (at 306) a query plan. Generation of the cost table 180 is further described below.

The visual explain and compare module 316 uses a set of defined icons to graphically depict an execution plan generated by the optimizer module 316 in the graphical user interface 318. Example icons that are displayable in the graphical user interface 318 include a Select icon, which represents the SQL SELECT statement to return rows in the form of a result table. An INSERT icon represents an SQL INSERT statement that inserts a row into a result table. A DELETE icon represents a DELETE statement that deletes one or more rows from a result table. An UPDATE icon represents an UPDATE statement that allows a user to modify data in one or more rows of a table.

Various lock step icons are also provided, including a ReadLock icon that represents a lock that is placed when a SELECT statement is performed to restrict access by a user who requires exclusive or write locks. A WriteLock icon represents a write lock that is performed when INSERT, DELETE, and UPDATE statements are performed on a table to restrict access by another user. Other icons may also be defined for other types of locks.

Icons representing retrieval of data may also be defined. For example, an AllAMPRetrieve icon represents an all AMP retrieval that is performed if data resides on more than two AMPs. A SingleAMPRetrieve icon represents retrieval of data from a single AMP. A TwoAMPRetrieve icon represents an all AMP retrieval that is performed if data resides on two AMPs. A MultiAMPRetrieve icon represents multi-AMP retrieval when using various hashing combinations.

Icons are also defined to represent data redistribution in the relational database system. A DuplicatedOnAllAMPs icon represents duplication of resultant rows across all AMPs. A Re-DistributedOnAllAMPS icon represents re-distribution of resultant rows across all AMPs. A Locally-BuildOnAllAMPs icon represents locally building resultant rows on all AMPs.

Various icons are also used for representing tables and spools. A Table icon represents the table on which the operation is to be performed. A Spool icon represents a spool where data is temporarily stored. Many other types of icons may also be defined. The types of icons that are desired is implementation specific, with different embodiments employing different types of icons to represent different operations and components of the relational database management system.

Referring to FIGS. 4–16, screens provided by the graphical user interface 318 for the visual explain feature are illustrated. In a main window 400, a pop-up screen 402 is provided to enable the user to log into a selected relational database management system (entered into a field 404) under a user name (entered into a field 406). A database name can be entered into a field 408 to select the database in the database management system to log into. In this case, the selected database is the QCD 314 (FIG. 3).

Figure 5:
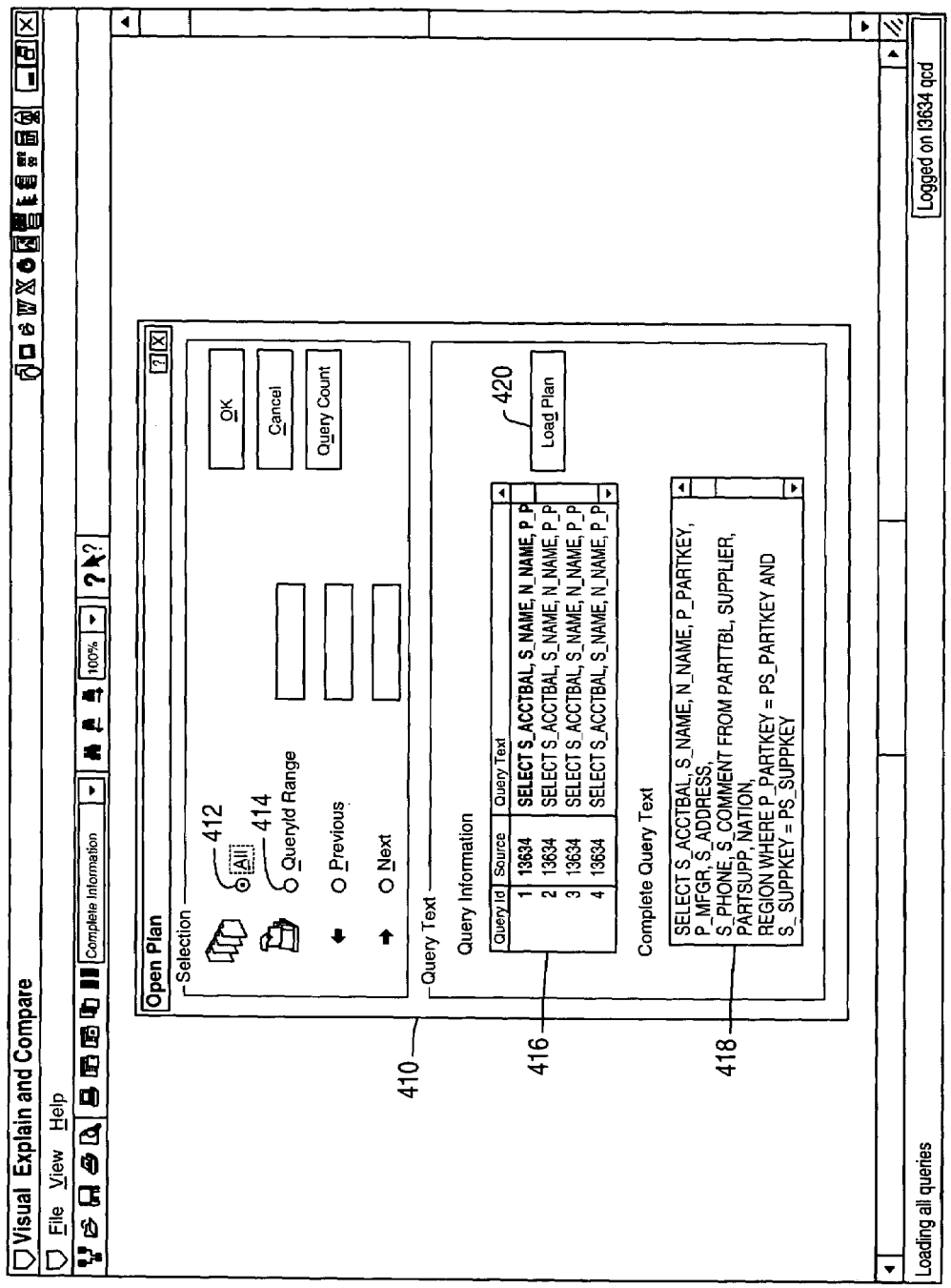

As shown in FIG. 5, after login, a screen 410 is displayed in which a user can select the query execution plans to open. Each query execution plan is stored under a query identifier (ID). The screen 410 provides an item 412 that is selectable to select all query execution plans or another item 414 in which a range of query IDs may be entered by the user to select the desired execution plans. The query execution plans are also listed in a box 416. The query text for the selected query execution plan is displayed in a box 418. Once the one or more query execution plans are selected, then a "Load Plan" button 420 can be selected to load the query execution plan.

Figure 6:
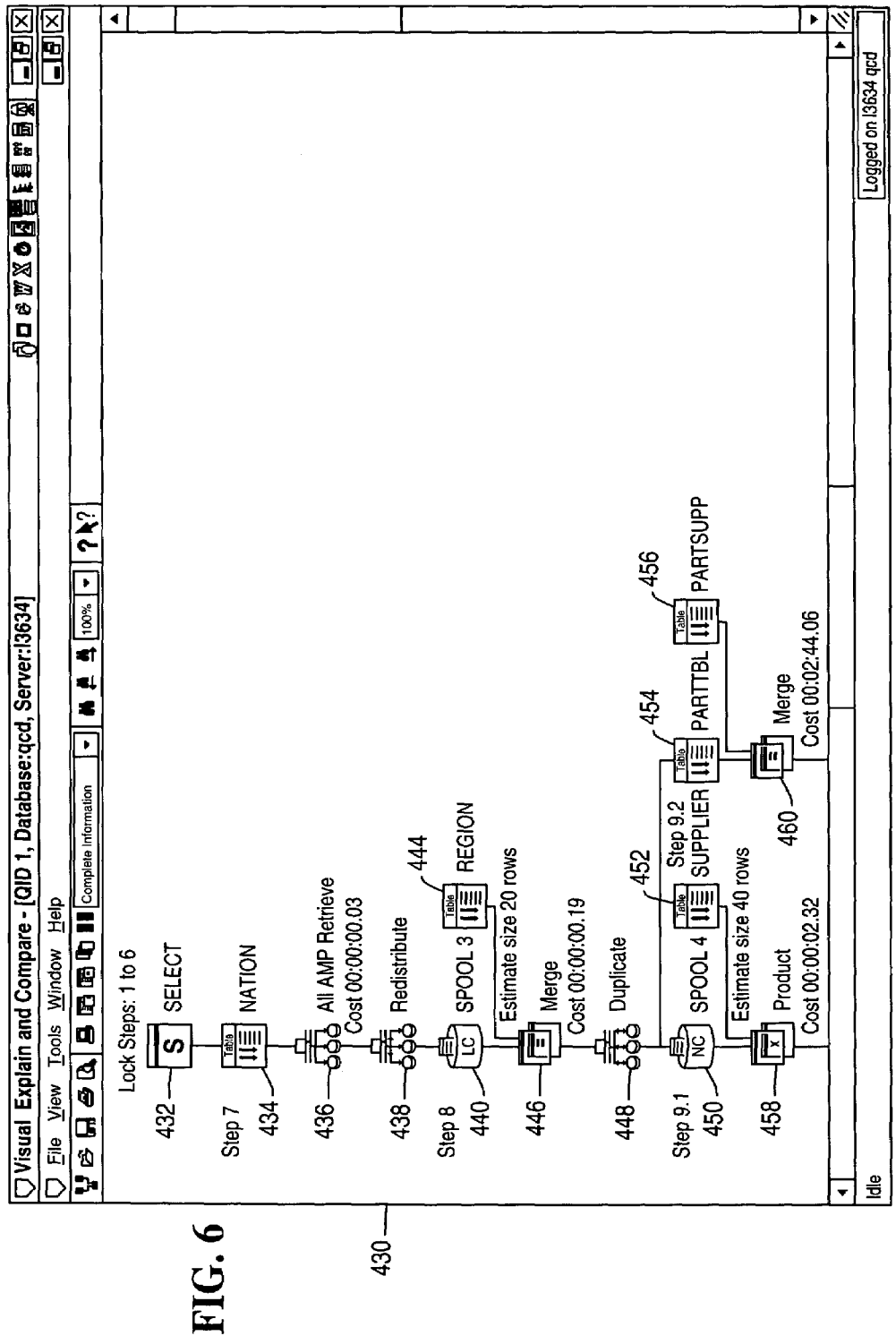

Referring to FIG. 6, a portion of an example query execution plan is shown in a screen 430. The example is provided for illustration purposes; other execution plans of varying degrees of complexity are also displayable by the visual explain and compare module 316. The screen 430 contains various icons that correspond to the operations or components involved in each step of the execution plan. Steps 1 through 6 are lock steps in which six tables are selected, as indicated by the SELECT icon 432. One of the tables selected is the Nation table, represented by the icon 434. Next, an AllAPRetrieve icon 436 represents retrieval of data from the Nation table 434 residing on more than two AMPs. The cost of the AllAMPRetrieve operation is about 0.3 seconds (00:00:00.03) in the example. Next, a Redistribute icon 438 represents an operation to redistribute a resultant row (created by retrieval of data from the Nation table 434) across all AMPs.

The data generated by the previous operations are temporarily stored in "Spool 3," as represented by a spool icon 440, which represents a temporary storage location, such as on a disk or other storage device. The estimated size of the resultant row stored in Spool 3 is 20 rows. An LC indication is provided in the spool icon 440 to indicate that the estimated size is a "low confidence" estimate.

Next a merge join operation (represented by icon 446) is performed on data stored in Spool 3 and a row from the Region table (represented by icon 444). The estimated cost of the merge join operation is about 0.19 seconds (00:00:00.19). A duplicate operation is then performed (as represented by icon 448) to duplicate the row resulting from the merge join operation across the AMPs. The merge-join resultant row is stored in "Spool 4," as represented by a spool icon 450. The estimated size of the merge-join resultant row is 40 rows, and the spool icon 450 contains an NC indication to indicate that the estimate is a "No Confidence" estimate.

Operations 458 (a relational product join) and 460 (a merge join) are performed in parallel. The product join operation is performed on the resultant row in Spool 4 and a row from a Supplier table (icon 452). The merge join is performed on a row from a PARTTBL table (icon 454) and a PARTSUPP table (456). The estimated cost of the product join operation is about 2.32 seconds (00:00:02.32), and the estimated cost of the merge join operation is about 2 minutes and 44.06 seconds (00:02:44.06).

Figure 7:
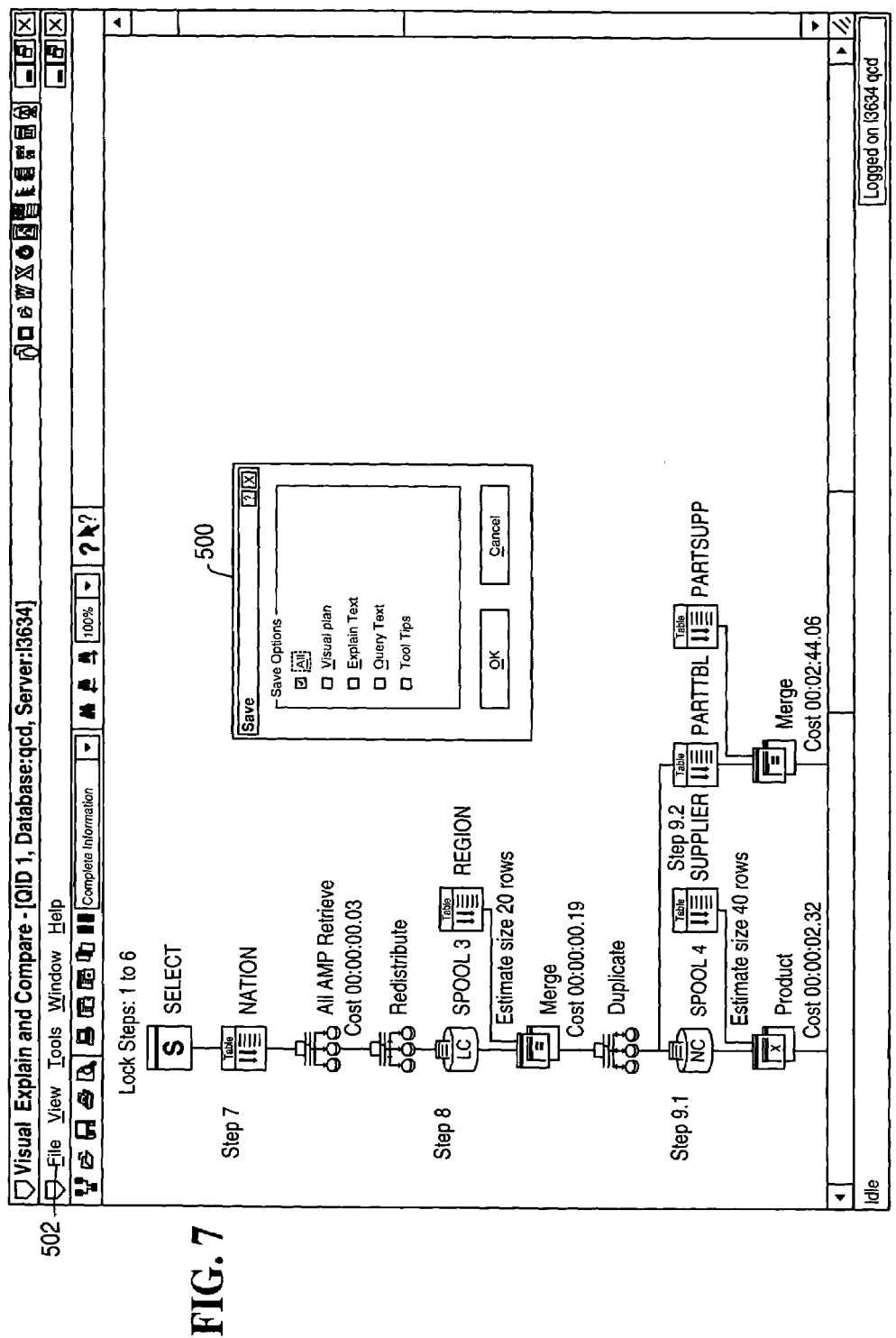
Figure 8:
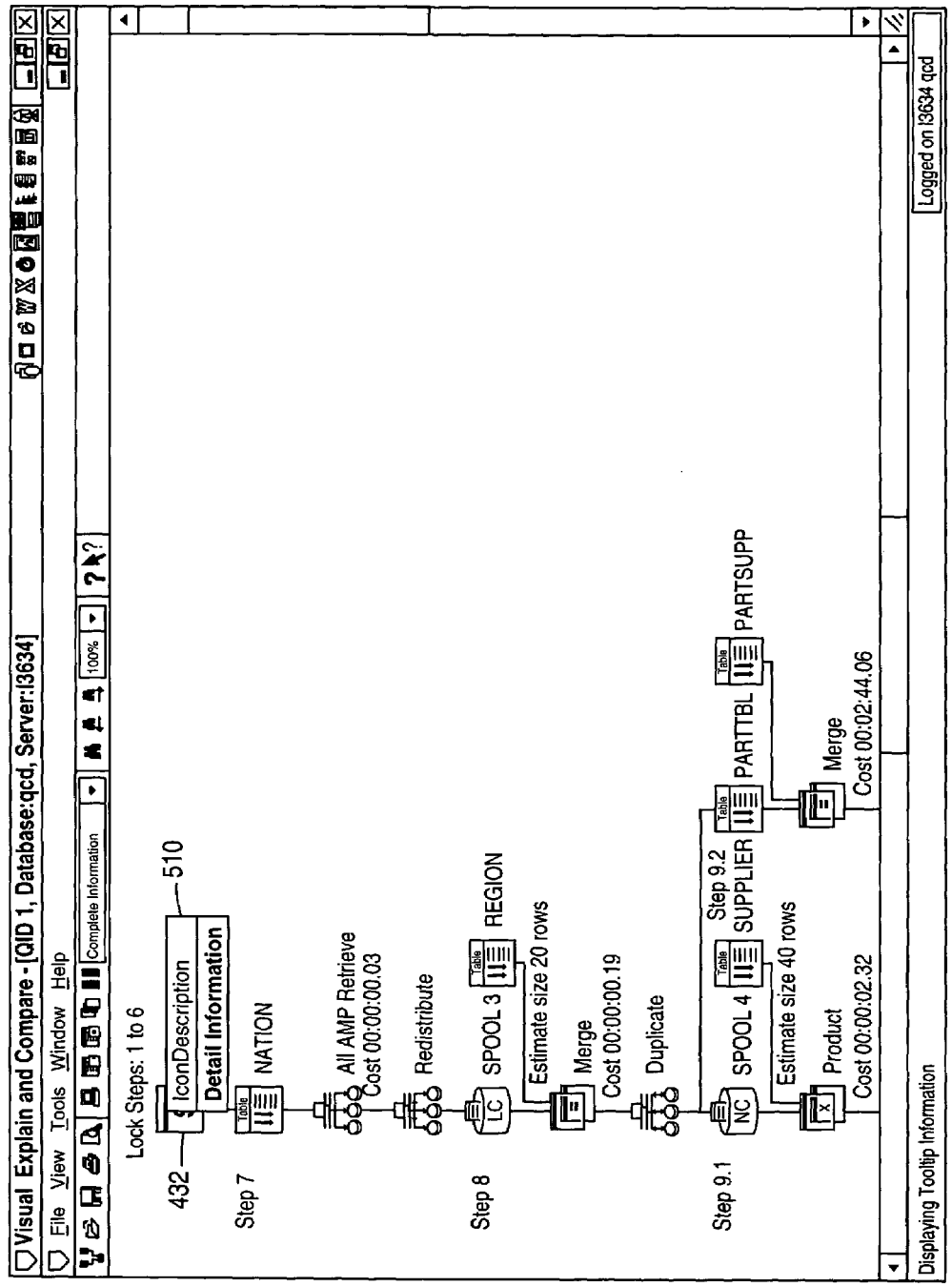
Figure 9:
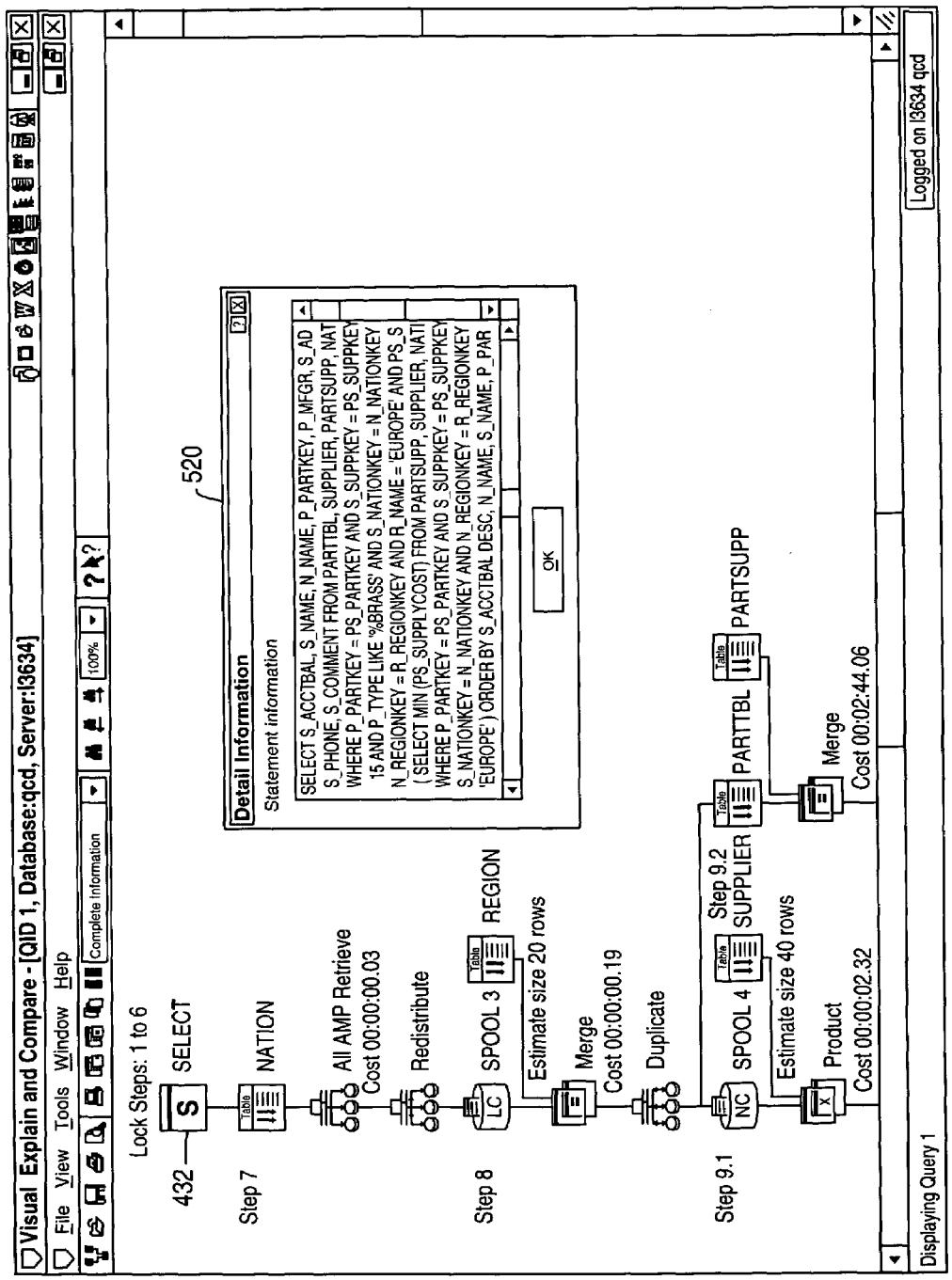

Referring to FIG. 7, the output of the illustrated execution plan can be saved by selecting the Save command from a File menu 502. In response, a pop-up screen 500 provides several selected options, including an option to save the visual plan (graphical display of the execution plan), the explain text (text description of the execution plan), the query text (text of the query itself), and tool tips (information about each icon). Another option is selectable to save all of the above listed components.

Referring to FIGS. 8–13, information about each of the icons of the displayed query execution plan may be shown. For example, a mouse pointer may be moved to the desired icon, such as the Select icon 432, and the left mouse button clicked. A pop-up screen 510 allows selection of the tool tips description of the icon or detailed information associated with the icon. If detailed information is selected, then a pop-up screen 520 (FIG. 9) is displayed to display detailed information about the icon. In this case, the detailed information displayed is the query text of the SQL Select statement selecting the six tables in the example.

Figure 10:
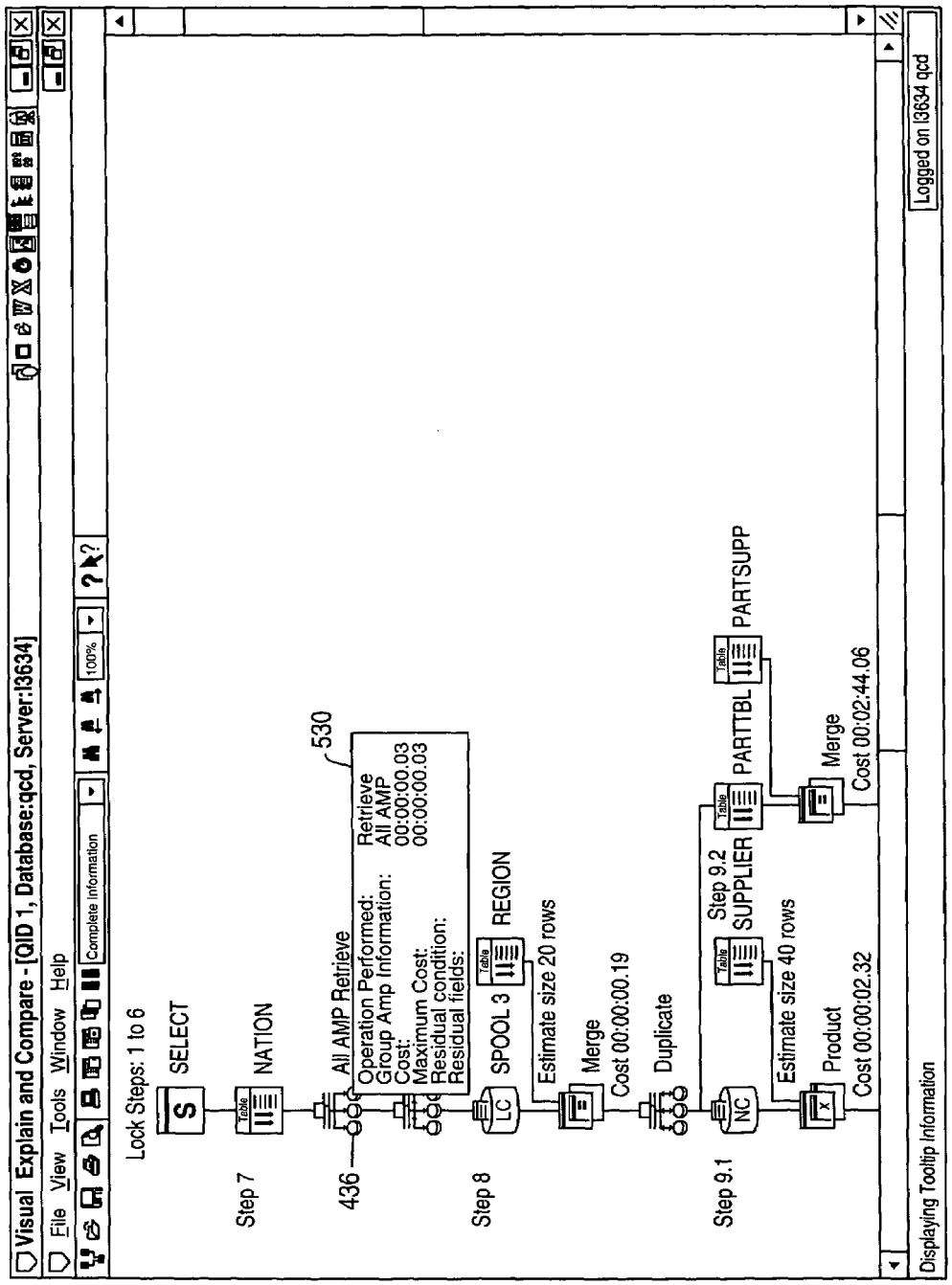
Figure 11:
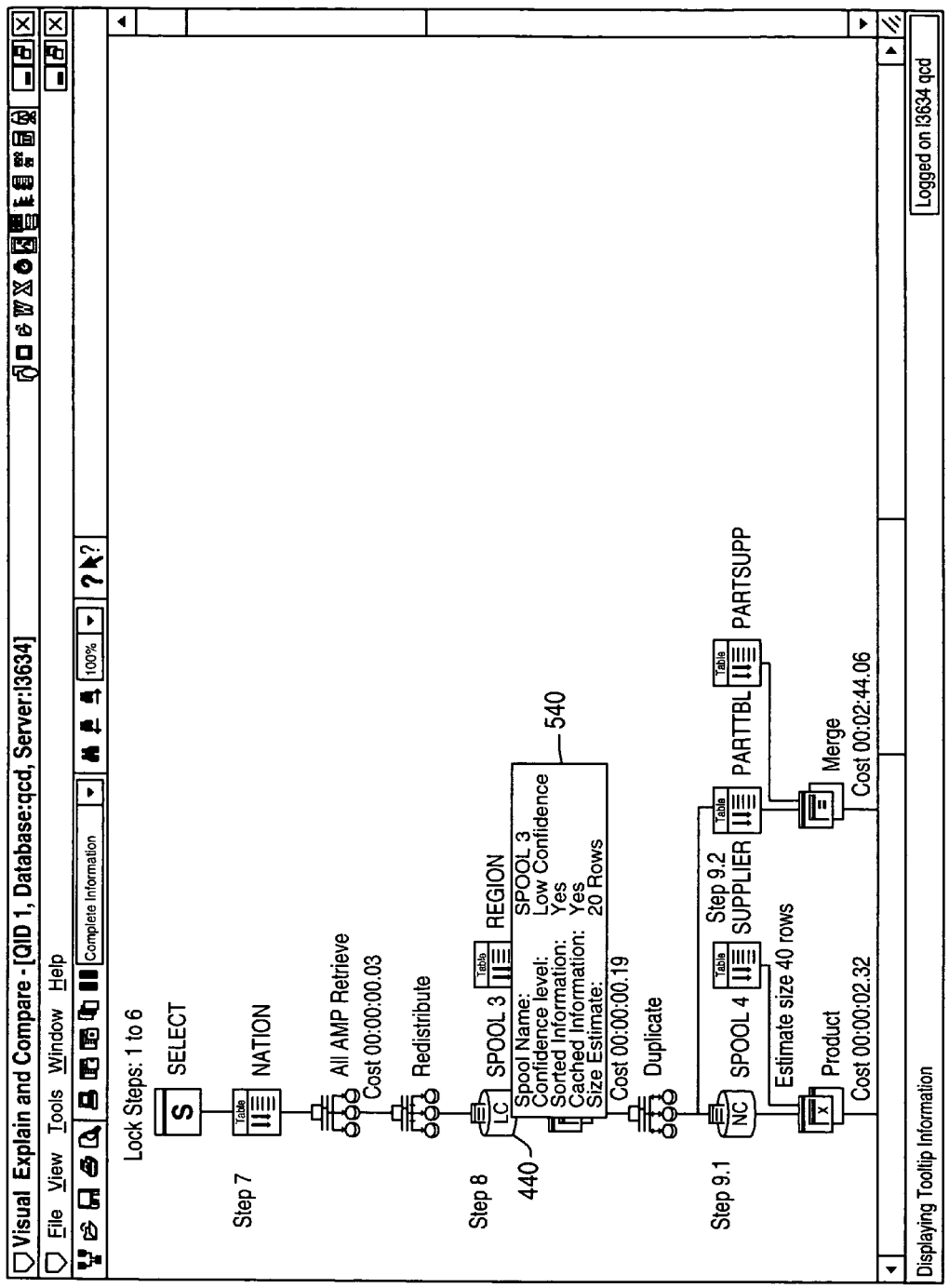
Figure 12:
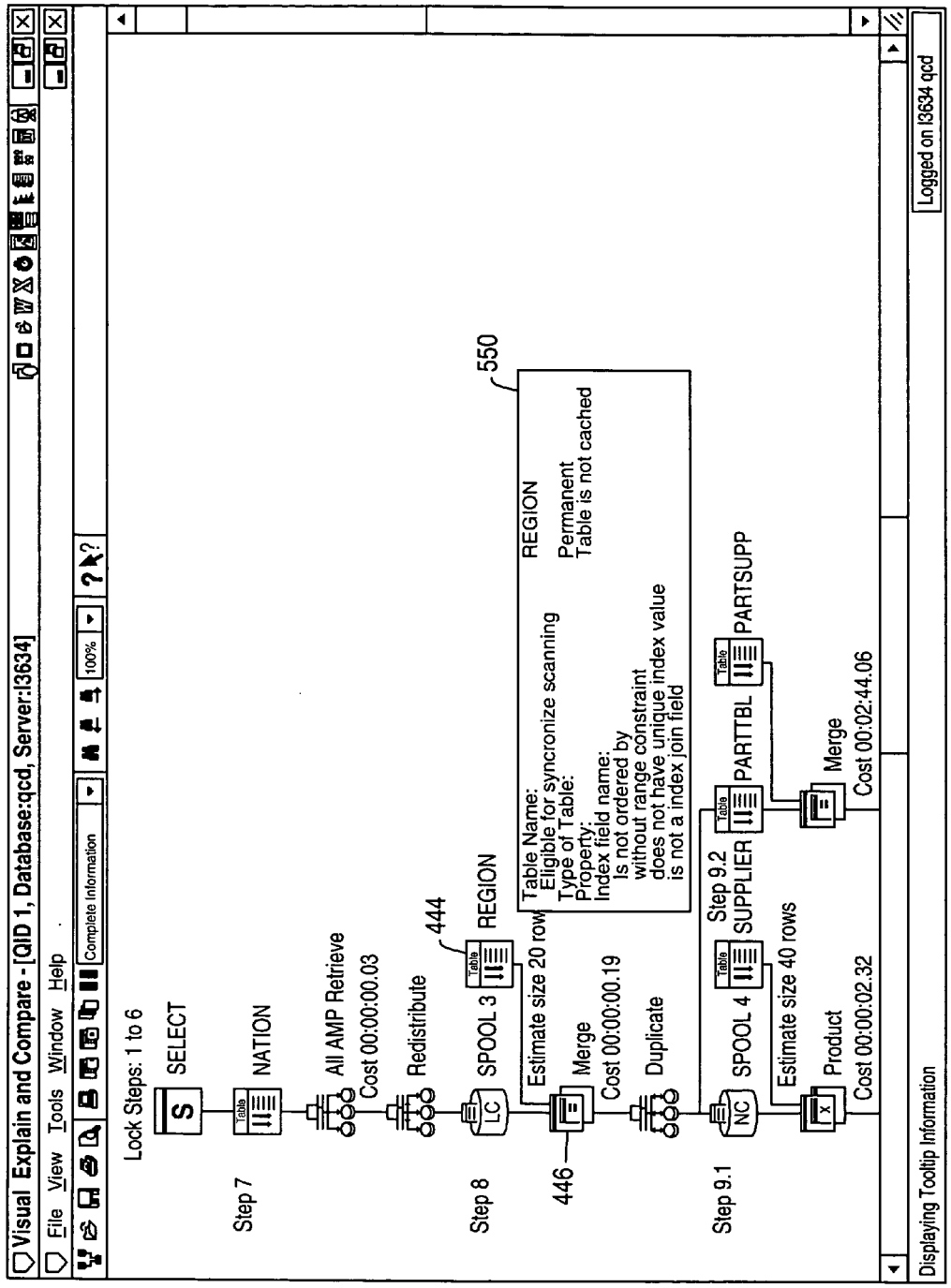
Figure 13:
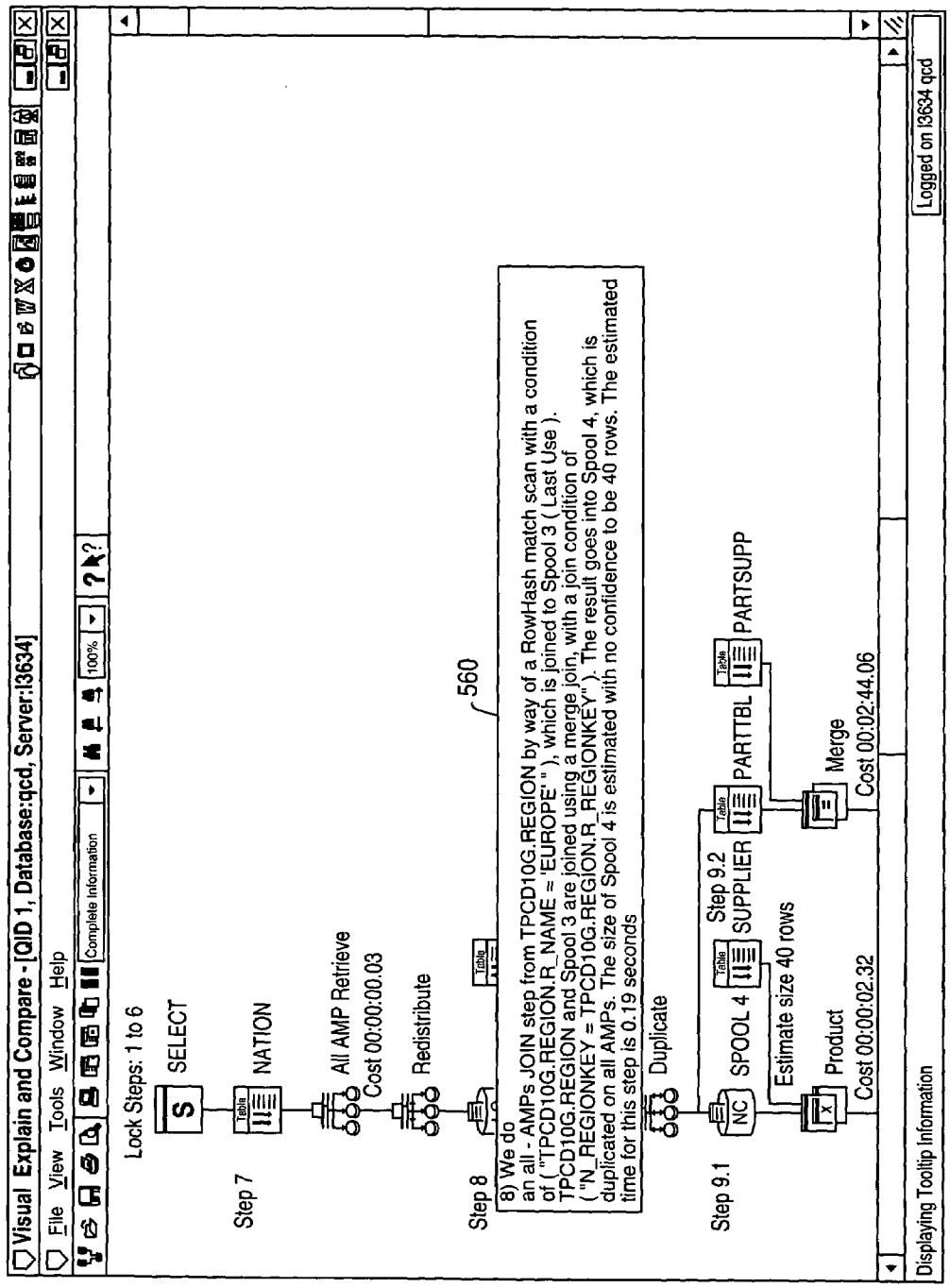

In FIG. 10, a screen 530 displaying the detailed information associated with the AllAMPRetrieve icon 436 is illustrated. In FIG. 11, a screen 540 displays the detailed information associated with the Spool 3 icon 440. In FIG. 12, a screen 550 displays detailed information associated with the Region table icon 444. In FIG. 13, the detailed information associated with the merge-join icon 446 is displayed in a screen 560.

Figure 14:
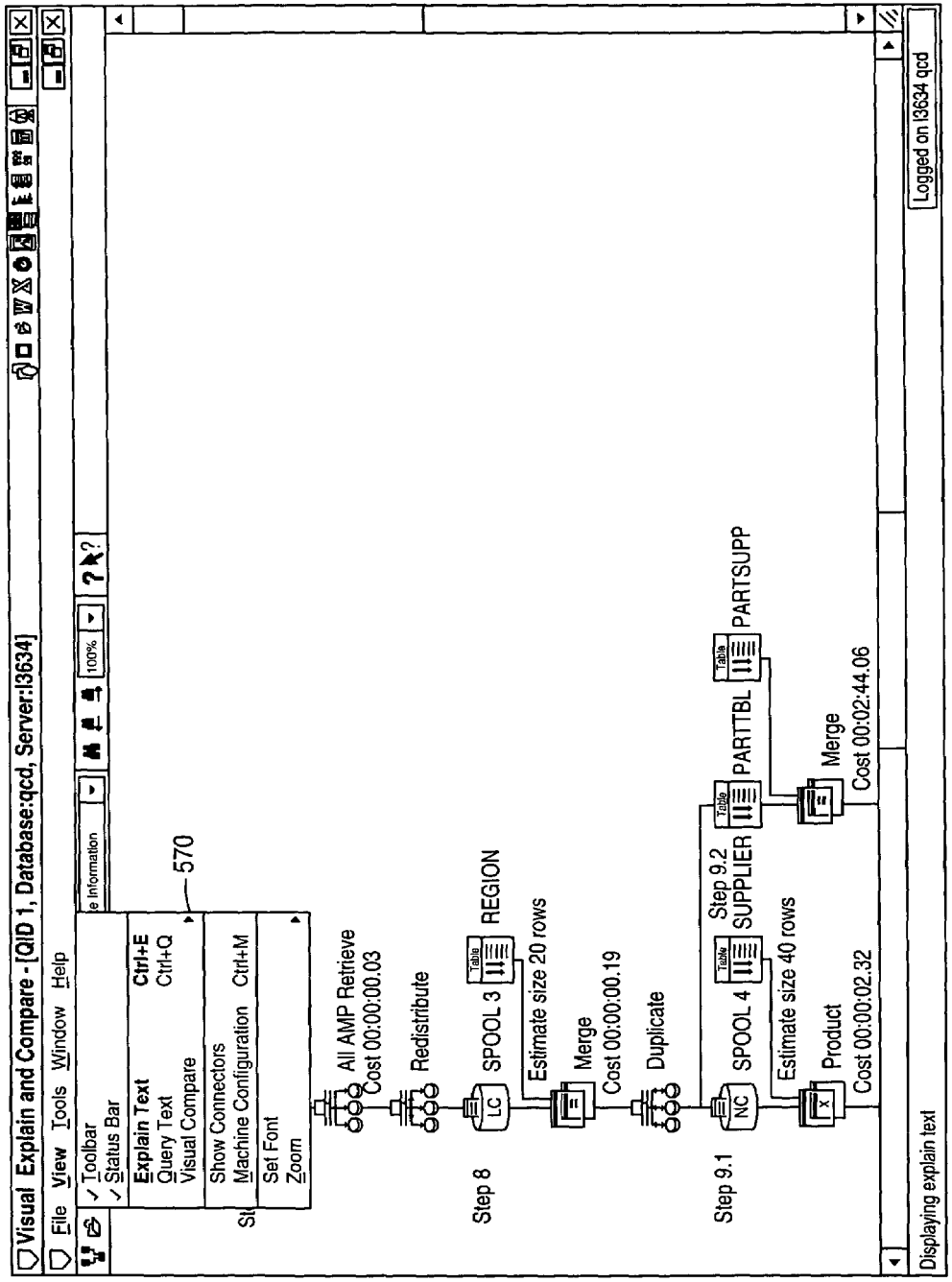
Figure 15:
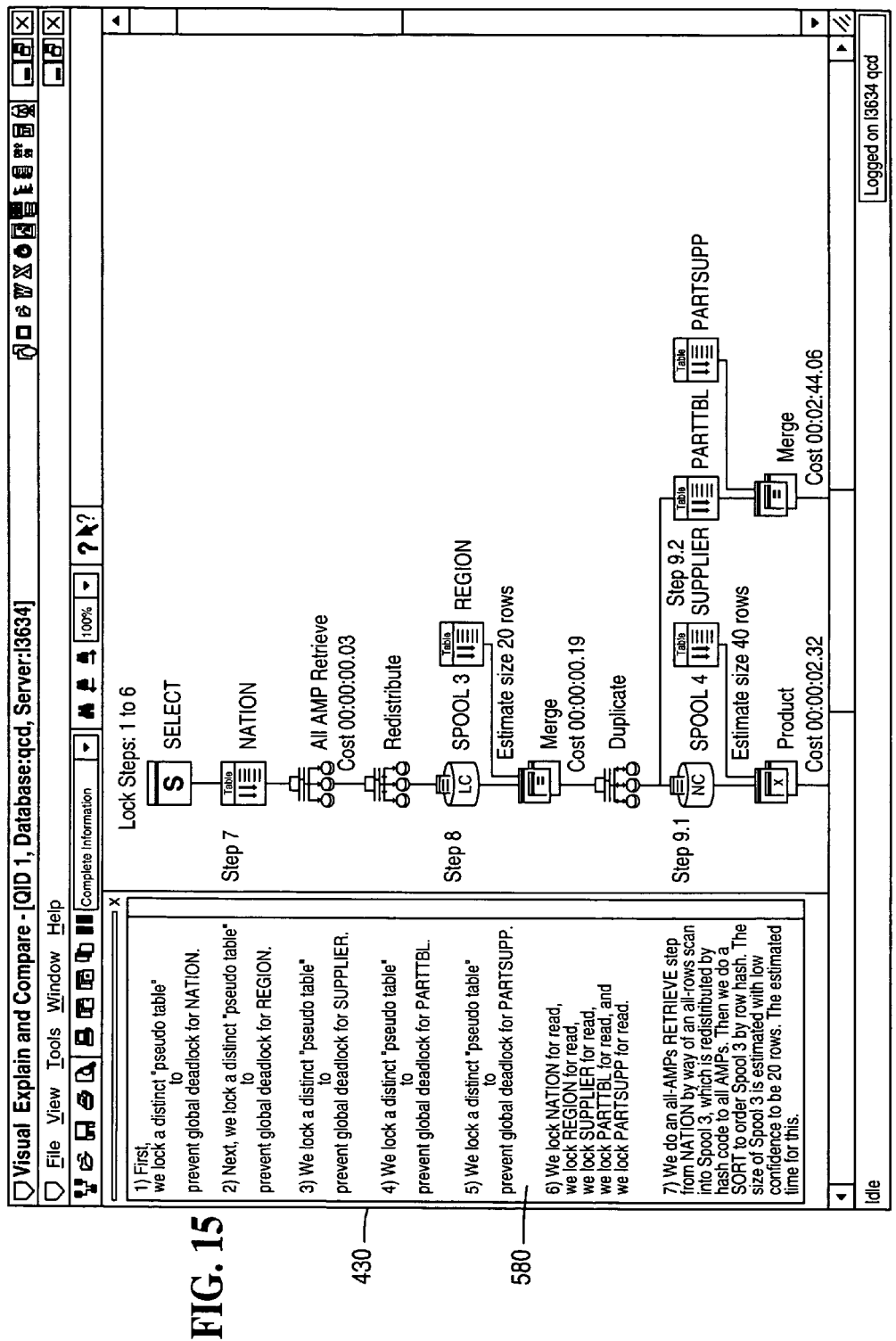
Figure 16:
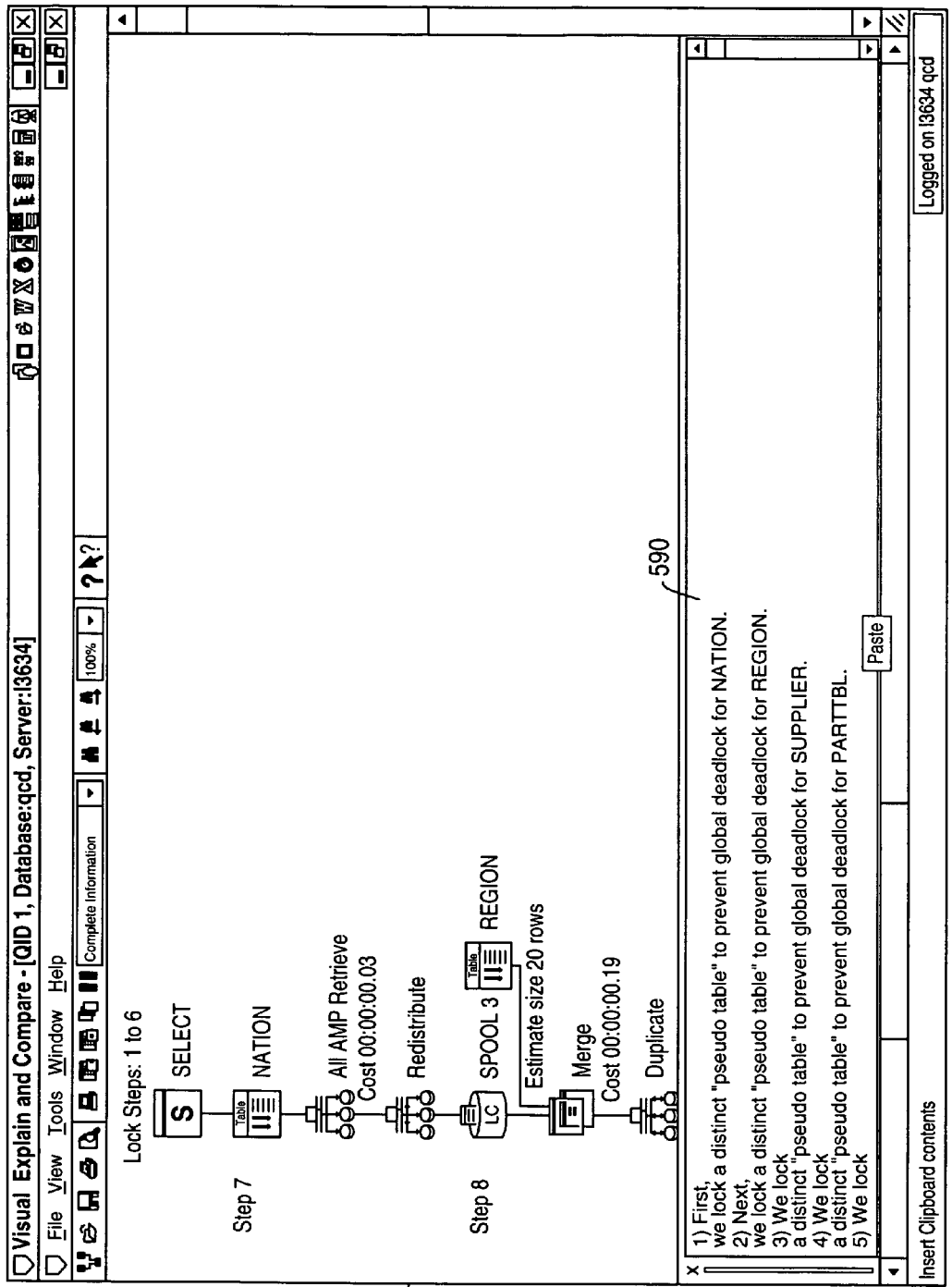

Another feature of the graphical user interface 318 provided by the visual explain and compare module 316 is the ability to concurrently view both the graphical representation and text description of a query execution plan. As shown in FIG. 14, an Explain Text command is selectable in a View menu 570. In response to selection of the Explain Text command, a box 580 is provided on the left side of the screen 430 (FIG. 15) to display the text corresponding to each step of the execution plan. Alternatively, as shown in FIG. 16, a box 590 is provided on the lower side of the screen 430 to display the text corresponding to each step of the execution plan.

Figure 17:
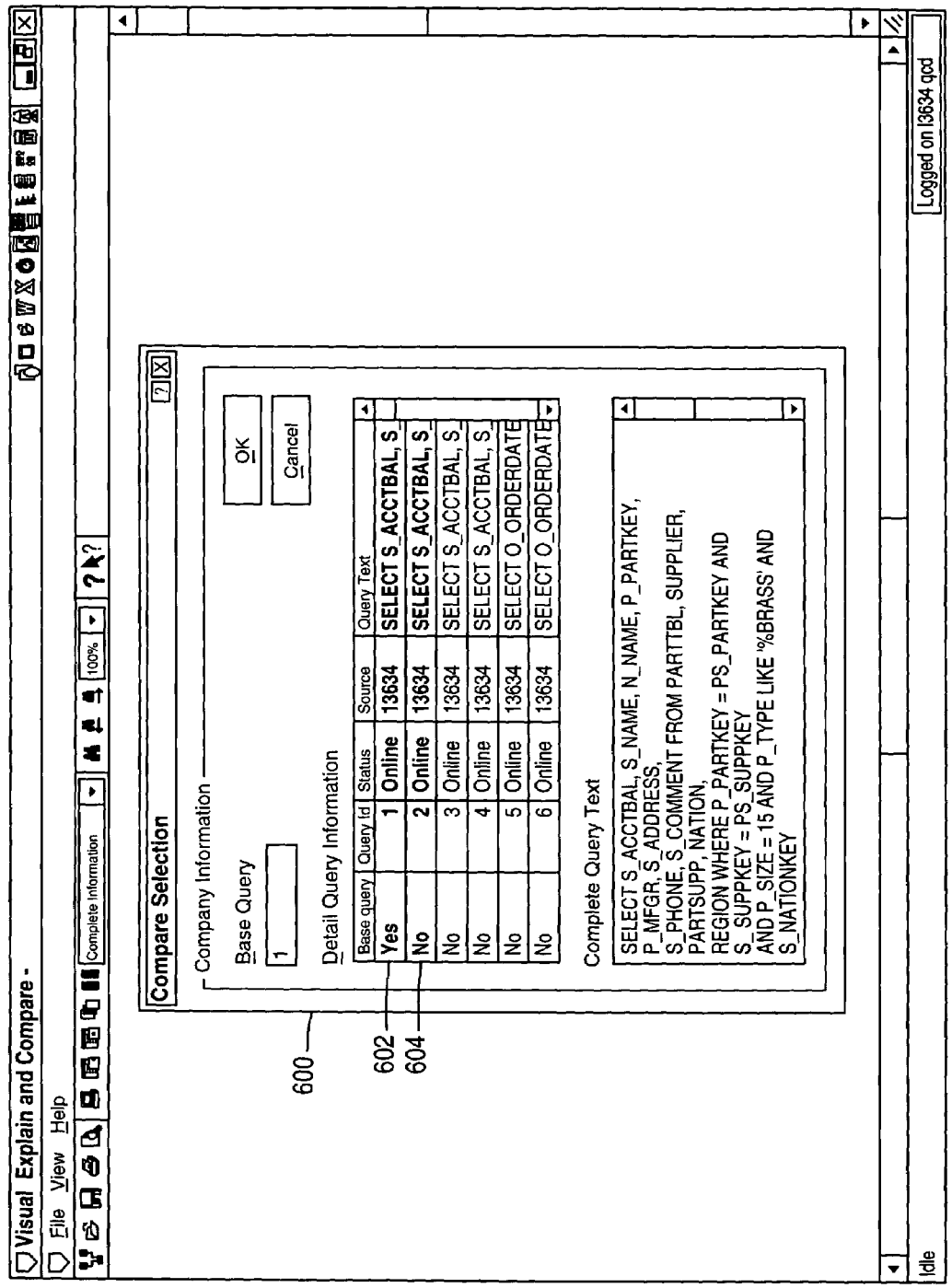
FIGS. 17–19 illustrate various screens to enable the visual compare of two or more query execution plans in accordance with an embodiment.

Referring to FIGS. 17–20, screens presented by the visual explain and compare module 316 for comparing query execution plans are illustrated. In FIG. 17, a "Compare Selection" screen 600 enables selection of a base query execution plan 602 and another query execution plan 604 to compare to the base query execution plan 602. The execution plans 602 and 604 correspond to the same query run under different conditions.

In response to selection of query execution plans for comparison, the base execution plan 602 is displayed in a first screen 610 and the second execution plan 604 is displayed in a second screen 612. The base execution plan 602 is the same as the execution plan shown in FIG. 6 (and the steps are assigned the same reference numerals).

One technique of improving accuracy in estimating performance of a query is by adding statistics to columns of a table. Statistics include information on how data is structured in the database, the number of rows in a table, the data demographics of a table, and highest and lowest values of a column. Statistics may be sampled randomly from each node of a target system. Alternatively, statistics are collected by users and stored in some predetermined format, such as in a histogram.

In the execution plan 602 displayed in screen 610, none of the tables contain statistics, while in the execution plan 604 displayed in screen 612, statistics are added to a column of a Nation table 634. With the statistics added to the Nation table 634, the number of estimated rows of a resultant table in Spool 3 (icon 640) is indicated as HC or "High Confidence." The estimated number of rows for Spool 3 (icon 640) is 25, while the estimated number of rows for Spool 3 (icon 440) is 20, which is indicated as being LC or "Low Confidence." Because of the change to the Nation table 634, the estimated number of rows, 60, for the Spool 4 (icon 650) in the screen 612 is different from the estimated number of rows, 40, for the Spool 4 (icon 450) in the screen 610.

Figure 19:
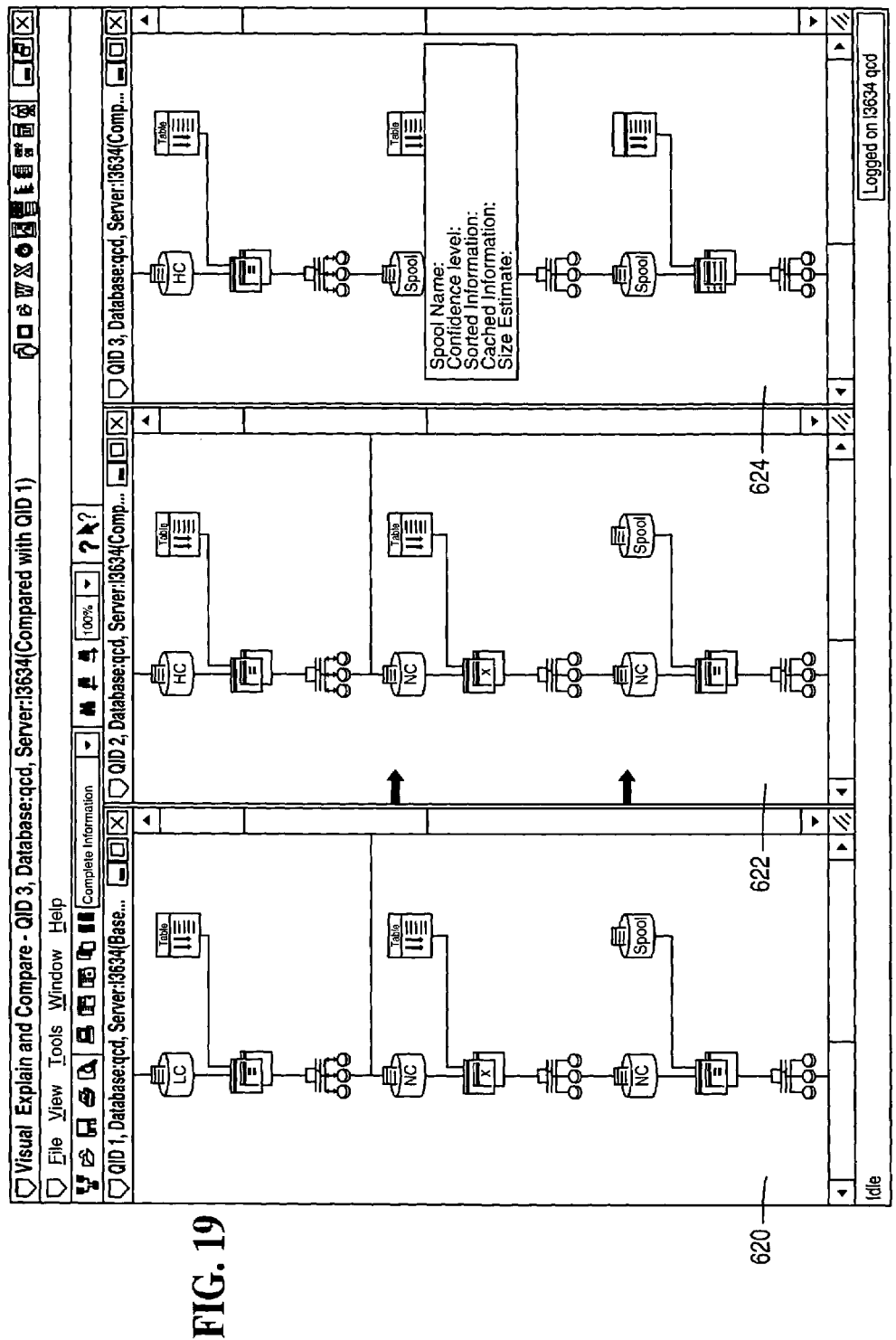

Referring to FIG. 19, three execution plans for a given query generated under three different conditions are displayed in respective screens 620, 622, and 624.

The visual explain and compare module of some embodiments of the invention provides for improved capabilities in analyzing performance of query execution plans. For complex execution plans, conventional explain text is often difficult to read and understand. With the graphical output of the visual explain and compare module, a more user-friendly interface is provided in which query execution plans may be analyzed. Further, plural execution plans of a query generated under different conditions may be displayed concurrently to enable a user to compare the execution plans for differences.

Figure 20:
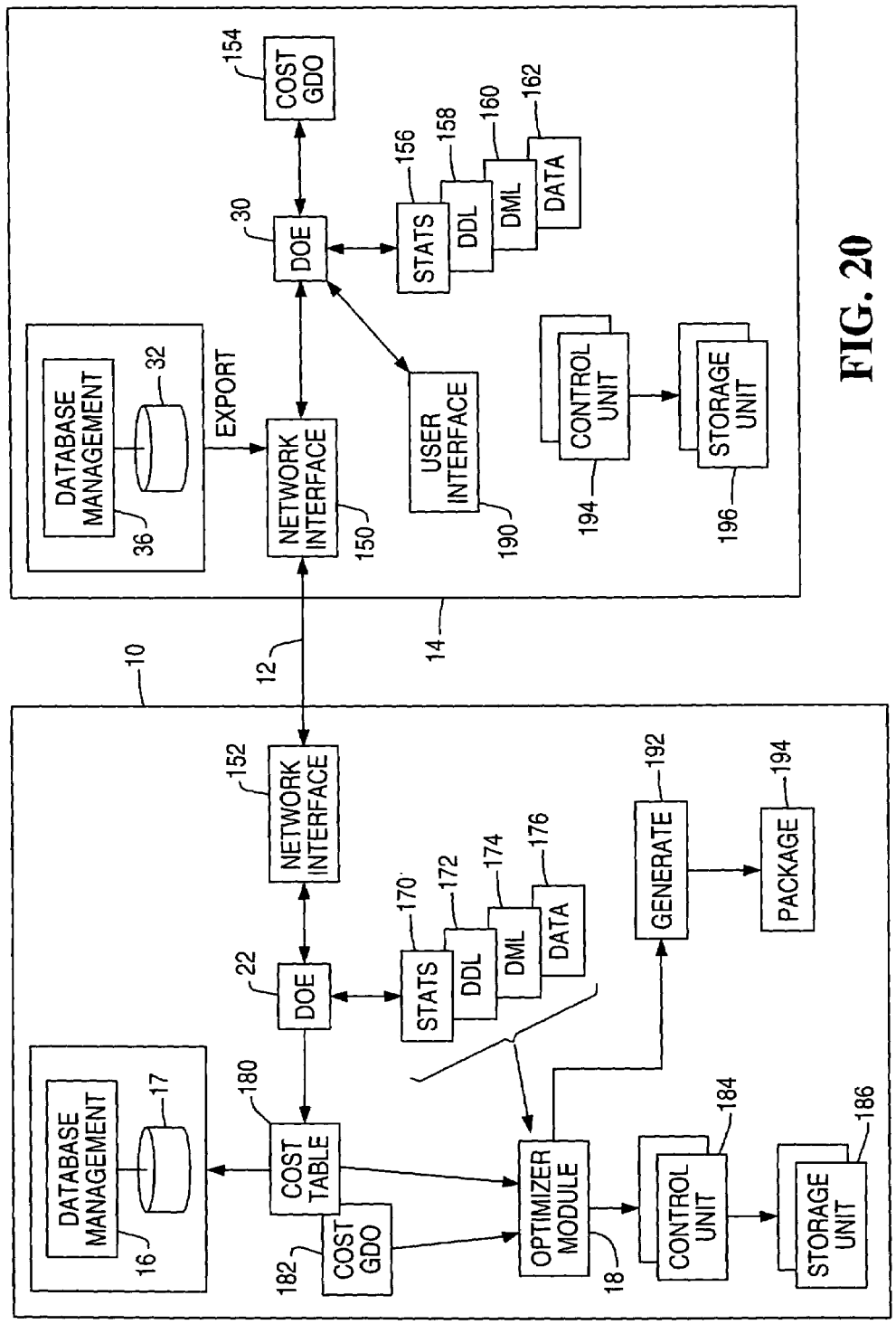
FIG. 20 is a block diagram of components of a target system and the test system of FIG. 1.

Referring to FIG. 20, components of the target system 14 and the test system 10 are illustrated in greater detail. As discussed above, the target system 14 contains various database-level information, including statistics 156, DDL statements 158, DML statements 160, and actual data 162 associated with the database 32. In addition, cost-related information may be contained in configuration files 154. In one embodiment, the configuration files 154 are referred to as cost global distributed objects (GDO).

Figure 21:
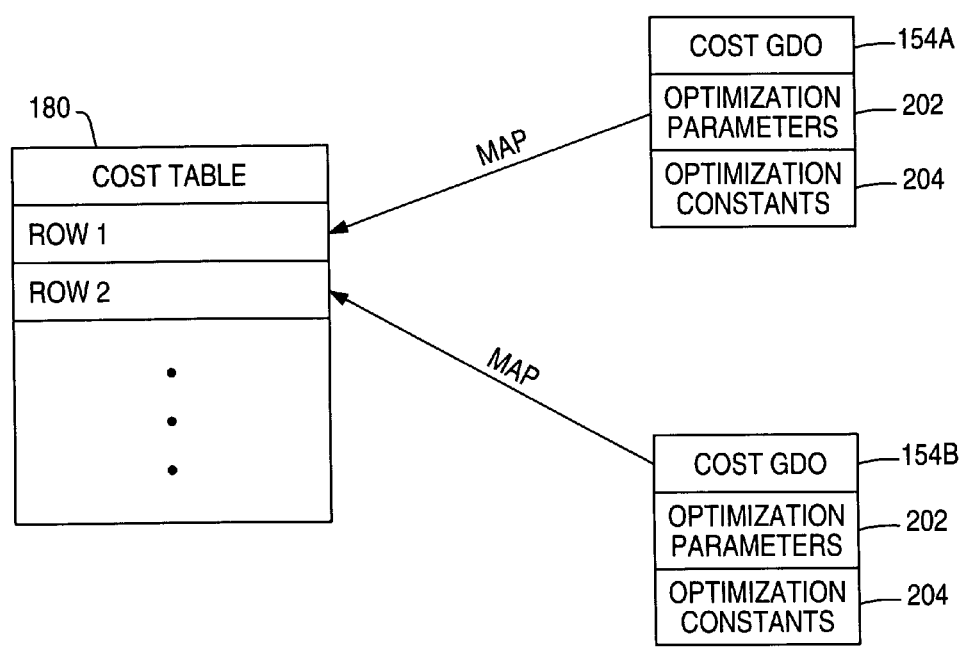
FIG. 21 illustrates configuration data and a cost table stored in respective target systems and the test system of FIG. 20.

As further shown in FIG. 21, the cost GDO 154 contains cost parameters 202 and cost constants 204 that may affect performance of various queries. FIG. 21 shows two cost GDOs 154A and 154B associated with respective target systems 14A and 14B. The cost parameters 202 include, as examples, the number of nodes of the corresponding system, the number of CPUs per node, the number of VPROCs per node, the amount of memory per VPROC, MIPS (millions of instructions per second) per CPU, disk array access speeds, disk access speeds, and network access speeds.

In addition to the optimization parameters 202, performance optimization constants 204 are also contained in the cost GDO 154. Performance optimization constants specify transfer rates for each kind of storage media and network interconnect in the target system. The target system 14 determines the values for the performance optimization constants at start-up and puts the appropriate sets of values into section 204 in the control GDO 154. Thus, for example, performance optimization constants may be specified for different types of disk arrays, such as disk arrays from different manufacturers or of different models. Although the illustrated embodiment shows the optimization parameters and optimization constants as separate components, the distinction may be removed in further embodiments.

To export or extract target information, the data object extractor 30 provides a user interface 190 through which a user may select desired information to export or dump into the test system 10. The user interface 190 may, for example, provide command lines, graphical user interface icons, and so forth to access the desired information in the target system 14. For example, the cost parameters 202 and performance optimization constants 204 may be extracted into one or more files (such as in binary format or in some other format) for communication through network interfaces 150 and 152 in respective systems 14 and 10 over the network 12. Desired statistics 156, DDL statements 158, DML statements 160, and user data 162 may also be extracted and communicated across the network 12 to the test system 10.

Figure 22:
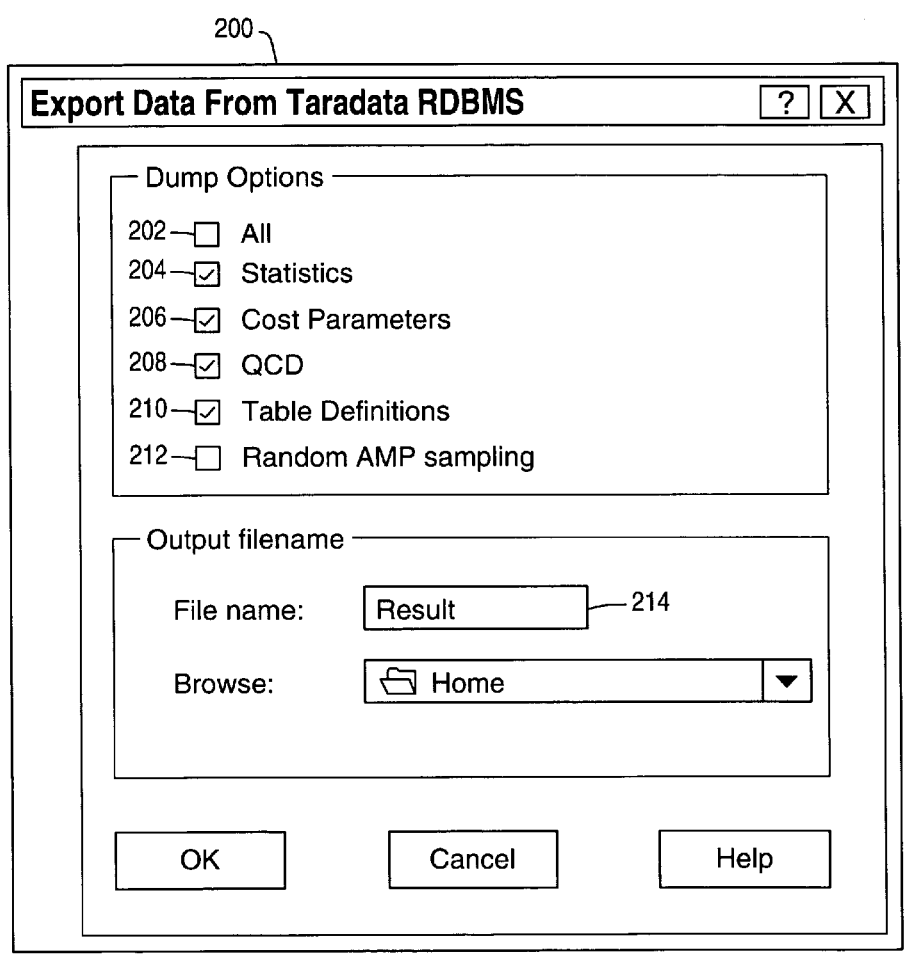
FIG. 22 illustrates an Export Data window to capture selected environment information of a target system, in accordance with an embodiment.

Referring further to FIG. 22, an Export Data window 200 that is part of the user interface 190 is illustrated. The Export Data window 200 allows the user to select the desired types of data to capture. One option is an "ALL" option 202, which causes the data object extractor 30 in the target system 14 to capture all selectable types of environment information. Alternatively, individual types of environment information may be selected by selecting a "STATISTICS" option 204 (to capture statistics data), a "COST PARAMETERS" option 206 (to capture cost-related information), a "QCD" option 208 (to capture query capture database information, which are databases that contain query information), a "TABLE DEFINITIONS" option 210 (to capture DML and DDL statements), and a "RANDOM AMP SAMPLING" option 212 (to capture random AMP samples). A file name 214 can be selected to identify the file to which the captured information is dumped.

Referring again to FIG. 20, the extracted information received from the target system 14 (e.g., by electronic mail, file transfer, web download, etc.) is applied to appropriate locations in the test system 10 (e.g., relational tables, files, and other locations). For example, the extracted statistics, DDL statements, DML statements, and user data may be stored in locations 170, 172, 174, and 176, respectively, by the data object extractor 22 running in the test system 10.

Figure 18:
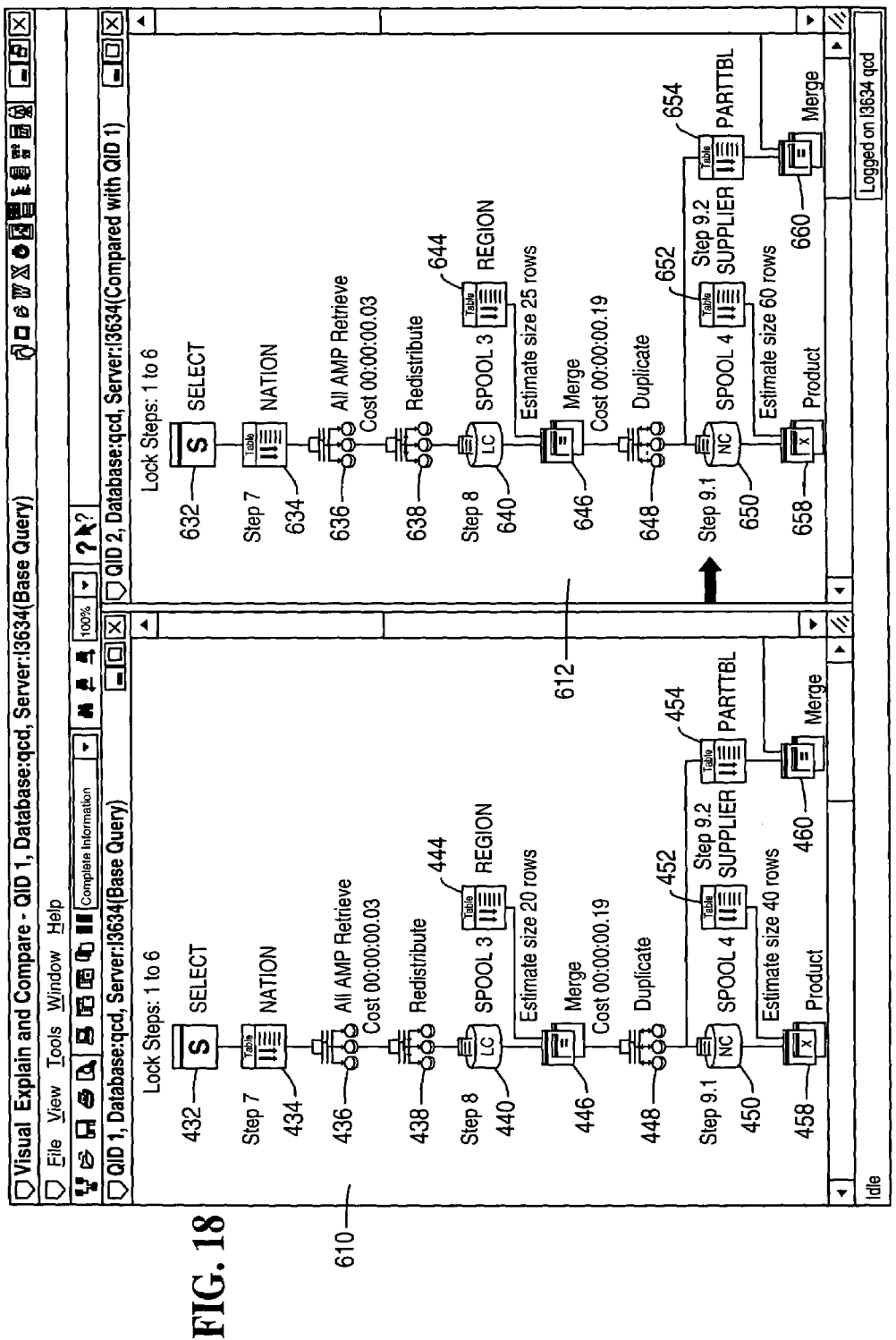

In addition, by use of a diagnostic query statement, the data object extractor 22 maps the extracted cost information into a cost table 180, which is a relational table. In one embodiment, the diagnostic query statement, which is a SQL statement, includes a diagnostic Dump Costs statement. The diagnostic Dump Costs statement dumps the extracted cost information into rows of the cost table 180. Each row may correspond to one target system 14, as illustrated in FIG. 18. Thus, multiple rows of the cost table 180 correspond to multiple target systems 14. The Dump Costs statement specifies a target system name, which is a unique primary key entry into the cost table 180. The target system name identifies a row in the cost table 180.

Another SQL diagnostic query statement is a diagnostic Set Costs statement, which directs the optimizer module 18 in the test system 10 to use the environmental cost parameters as defined in the cost table 180 when performing optimization tasks. The Set Costs statement can also specify at which level optimization is to be performed. In one embodiment, separate levels are defined, including a Request level, a Session level, an IFP (interface processor) level, and a System level. When the Request level is selected, the optimizer module 18 is directed to use the appropriate values of the cost table 180 for the current request. When the Session level is selected, the optimizer module 18 is directed to use appropriate entries of the cost table 180 for the current user session. A system has multiple sessions, with one session assigned to each user of the system. In a session, multiple requests can be issued. When the IFP level is selected, the optimizer module 18 is directed to use the cost table 180 for the current IFP. When the system level is selected, the optimizer module 18 is directed to access a row of the cost table 180 to create a cost GDO 182. Effectively, at the system level, the cost information transferred from the target system 14 is used by the optimizer module 18 for the entire system, for all IFPs, for all sessions, and for all requests. Different entries (or combinations of entries) in the columns of a given row of the cost table 180 are used depending on which level is selected.

The optimizer module 18 includes cost functions that are called to perform optimization tasks. The cost functions are used to determine costs based on the environment attributes, which have been downloaded from the target system 14. For example, the costs functions may include a FindNumBlocks function, which calculates the number of blocks in a relation. Another function is the DiskCost function, which calculates the cost of disk operation. A VAMPsPerCPU function returns the number of VAMPs for an operation. A VAMPsPerPMA function 214 returns the number of VAMPs for each node. An OptRDup function 216 computes the cost of a row duplication. Various other cost functions also exist in the test system 10 that can be called by the optimizer module 18.

Some contents of each row of the cost table 180 are described below. A field TARGET_SYS_NAME is a unique primary value (unique primary key) to identify the target system. This primary key is used by the diagnostic Set Costs statement to identify the row from the cost table 180 that the optimizer module 18 is to use. Another entry of the cost table 18 identifies the type of the target system. Another parameter, OptAmpCnt specifies the number of nodes in the target system, and a parameter IFPCnt specifies the number of IFPs in the system. An OptSysCPUWeight field defines the system assigned weight to the CPU contribution for the optimization of a request. A field OptSysDiskWeight defines the system assigned weight to the disk contribution for the optimization of a request. A parameter OptSysNetWeight defines the system assigned weight to the network contribution for the optimization of a request. A parameter OptRowAccessCost field defines the cost of accessing a row in memory. A parameter OptOutputRowCost field defines the overhead cost for building an output row. A field OptRedistributeCost defines the cost of redistributing a row.

In addition, a field OptCPUsPerPMA defines a number of CPUs in a processor module assembly (PMA), or node. A field OptVampsPerPMA defines the number of VAMPs in a node. A field OptVampsPerCPU defines the number of VAMPs per CPU. A field OptPMAsPerDiskArray defines the number of nodes connected to a disk array. Numerous other entries may be defined in the cost table 18.

The various entries listed above are provided for purposes of illustration only, and are not intended to limit the scope of the invention. The types of entries that are contained in the cost table 180 is implementation-specific, and depends on how the optimizer module 18 is designed. Different types of optimizer modules may utilize different types of cost information and thus the cost entries in the cost table 180 may vary in different embodiments.

The various software modules or routines discussed herein, such as the optimizer module 18, the data object extractor 22 and 30, and other software modules or routines may be executable on corresponding control units. For example, as shown in FIG. 20, software modules or routines may be executable on one or more control units 184. Instructions and data associated with the software modules or routines may be stored in one or more storage units 186. Similarly, software modules or routines may be executable on one or more control units 194 in the target system 14. Instructions and data associated with the software modules or routines may be stored in one or more storage units 196. Each control unit may include a microprocessor, a microcontroller, a processor card (including one or more microprocessors or microcontrollers), or other control or computing devices. As used here, a "controller" can refer to either hardware or software or a combination of both.

Each storage unit includes one or more machine-readable storage media for storing data and instructions. The storage media includes different forms of memory including semiconductor memory devices, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tapes; an optical media such as compact disks (CDs) or digital video disks (DVDs). Instructions that make up the various software layers, routines or modules in the various systems or nodes may be stored in the respective storage units. The instructions, when executed by a respective control unit, calls the corresponding system to perform programmed acts.

The instructions of the software layers, routines or modules may be transported to a system in one of many different ways. For example, code segments including instructions stored on floppy disks, CD or DVD media, a hard disk, or transported through a network interface card, modem, or other interface device may be loaded into the system and executed as corresponding software layers, routines, or modules. In the loading or transport process, data signals that are embodied in carrier waves (transmitted over telephone lines, network lines, wireline links, cables, and the like), may communicate the code segments, including instructions, to the network element. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of presenting an execution plan for a query, comprising:
   determining steps of the query execution plan for a parallel database system;
   displaying the steps of the query execution plan in a graphical user interface; and
   depicting parallel execution of steps of the query execution plan in the graphical user interface,
   wherein depicting the parallel execution of steps comprises displaying plural elements corresponding to concurrently executing plural steps on respective processors of the parallel database system; and wherein determining the steps comprises determining steps of the query execution plan for the parallel database system running in a platform having plural virtual processors to handle access to data in the parallel database system.

2. A method of presenting an execution plan for a query, comprising:

determining steps of the query execution plan for a parallel database system;

displaying the steps of the query execution plan in a graphical user interface; and depicting parallel execution of steps of the query execution plan in the graphical user interface, wherein depicting the parallel execution of steps comprises displaying plural elements corresponding to concurrently executing plural steps on respective processors of the parallel database system; and wherein determining the steps of the query execution plan is performed by an optimizer based on emulated environment data of a target system, the optimizer and emulated environment data present in a test system, the target system comprising the parallel database system.

3. A method of presenting an execution plan for a query, comprising:

determining steps of the query execution plan for a parallel database system;

displaying the steps of the query execution plan in a graphical user interface; and depicting parallel execution of steps of the query execution plan in the graphical user interface, wherein depicting the parallel execution of steps comprises displaying plural elements corresponding to concurrently executing plural steps on respective processors of the parallel database system; and wherein determining the steps of the query execution plan is performed in a test system based on emulated environment data of a target system that is separate from the test system, the target system comprising the parallel database system.

4. A method of testing performance of a query, comprising:

determining a first execution plan of the query under a first condition;

determining a second execution plan of the query under a second condition; and displaying the first and second execution plans concurrently to enable comparison of the execution plans.

5. The method of claim 4, wherein displaying the first and second execution plans comprises displaying the execution plans in a graphical user interface.

6. The method of claim 4, wherein displaying the first and second execution plans comprises displaying the execution plans in a graphical user interface having a first screen to display the first execution plan and a second screen to display the second execution plan.

7. The method of claim 4, wherein displaying the first and second execution plans comprises displaying a collection of icons to represent steps of each of the execution plans.

8. The method of claim 4, further comprising:

determining a third execution plan of the query under a third condition; and displaying the first, second, and third execution plans concurrently to enable comparison of the execution plans.

9. The method of claim 4, wherein determining the first execution plan comprises determining an execution plan for the query in cooperation with a first version of a software module of a parallel database system.

10. The method of claim 9, wherein determining the second execution plan comprises determining an execution plan for the query in cooperation with a second version of the software module of the parallel database system.

11. The method of claim 4, wherein determining the first execution plan comprises determining an execution plan for the query in a system having a first arrangement.

12. The method of claim 11, wherein determining the second execution plan comprises determining an execution plan for the query in a system having a second arrangement.

13. The method of claim 4, wherein determining the first execution plan comprises determining an execution plan involving a table having a first content.

14. The method of claim 13, wherein determining the second execution plan comprises determining an execution plan involving the table having a second content.

15. The method of claim 14, wherein the second content contains statistics.

16. The method of claim 4, wherein determining the first execution plan comprises determining the first execution plan in a parallel database system environment, determining the second execution plan comprises determining the second execution plan in the parallel database system environment, and displaying each of the first and second execution plans comprises displaying plural elements corresponding to concurrently executing plural steps on respective processors of the parallel database system environment.

17. The method of claim 16, wherein displaying the plural elements comprises displaying the plural elements side-by-side to indicate concurrent execution of the respective steps.

18. The method of claim 17, further comprising displaying other elements in sequence with the plural side-by-side elements to indicate sequential execution of other steps corresponding to the other elements.

19. A system comprising: a graphical user interface; and a controller to determine an execution plan of a query based on emulation data that emulates an environment of a target system in which a parallel database system is implemented, the controller to display a representation of the execution plan in the graphical user interface.

20. The system of claim 19, wherein the emulation data comprises cost-related information including a number of nodes in the target system and a number of CPUs in each node.

21. The system of claim 19, wherein the emulation data comprises cost-related information including a number of virtual processors running in the target system.

22. The system of claim 19, wherein the emulation data comprises cost-related information relating to costs of doing operations in the target system.

23. The system of claim 19, wherein the emulation data represents a target system having a multi-node parallel processing system.

24. The system of claim 19, wherein the emulation data represents a target system running plural virtual processors for handling access to the parallel database system.

25. An article comprising one or more storage media containing instructions that when executed cause a controller to:

determine an execution plan of a query for a parallel database system; display the steps of the execution plan in a graphical user interface; and depict parallel execution of steps of the execution plan in the graphical user interface, wherein depicting the parallel execution of steps comprises displaying plural elements corresponding to concurrently executing plural steps on respective processors of the parallel database system; and wherein the instructions when executed cause the controller to receive environment information to emulate a target database system.

26. The article of claim 25, wherein the instructions when executed cause the controller to determine the execution plan of the query based on the environment information.

27. An article comprising one or more storage media containing instructions that when executed cause a controller to:

determine an execution plan of a query for a parallel database system; display the steps of the execution plan in a graphical user interface; and depict parallel execution of steps of the execution plan in the graphical user interface, wherein depicting the parallel execution of steps comprises displaying plural elements corresponding to concurrently executing plural steps on respective processors of the parallel database system; and wherein the execution plan comprises a first execution plan, wherein the instructions when executed cause the controller to further:

determine a second execution plan of the query for the parallel database system; and display the steps of the second execution plan concurrently with the steps of the first execution plan in the graphical user interface.

* * * * *